United States Patent [19]

Brackett

[11] Patent Number: 5,513,541
[45] Date of Patent: May 7, 1996

[54] CONJUGATE DRIVE MECHANISM

[76] Inventor: Douglas C. Brackett, 2535 Mason Oaks Dr., Valricho, Fla. 33594

[21] Appl. No.: 316,855

[22] Filed: Oct. 3, 1994

Related U.S. Application Data

[63] Continuation-in-part of Ser. No. 210,875, Mar. 18, 1994, Pat. No. 5,445,039.

[51] Int. Cl.⁶ ................................. F16H 21/18
[52] U.S. Cl. .................... 74/49; 74/50; 92/138; 92/237
[58] Field of Search .................. 74/44, 49, 50; 92/138, 157, 237; 123/55.5, 55.7

[56] References Cited

U.S. PATENT DOCUMENTS

| | | | |
|---|---|---|---|
| 5,741 | 8/1848 | McLaughlin . | |
| 19,726 | 3/1858 | Van Doren . | |
| 34,400 | 2/1862 | Barden . | |
| 116,617 | 7/1871 | McCamy . | |
| 130,371 | 8/1872 | Hendryx . | |
| 139,499 | 6/1873 | Doolittle | 74/44 |
| 185,521 | 12/1876 | Gregersen . | |
| 283,558 | 8/1883 | Baumgarten . | |
| 347,644 | 8/1886 | Salmon | 92/138 X |
| 410,432 | 9/1889 | McKaig | 92/138 X |
| 508,387 | 11/1893 | Humphries . | |
| 637,450 | 11/1899 | Doolittle | 74/49 X |
| 671,583 | 4/1901 | Carmack . | |
| 735,743 | 8/1903 | Fowler . | |
| 762,646 | 6/1904 | Morison | 92/138 X |
| 795,244 | 7/1905 | Armstead . | |
| 813,736 | 2/1906 | Pendleton . | |
| 999,220 | 8/1911 | Harmon . | |
| 1,151,220 | 8/1915 | Scherling . | |
| 1,156,055 | 10/1915 | Bullock . | |
| 1,349,660 | 8/1920 | Buhl . | |
| 1,505,856 | 8/1924 | Briggs . | |
| 1,508,614 | 9/1924 | Powell . | |
| 1,687,425 | 10/1928 | Briggs . | |
| 1,825,096 | 9/1931 | Schwemlein . | |
| 2,121,214 | 6/1938 | Vandervoort . | |
| 2,312,057 | 2/1943 | Williams . | |
| 2,330,552 | 9/1943 | Brooks . | |
| 2,357,247 | 8/1943 | Wilkinson . | |
| 2,366,237 | 1/1943 | Clausen . | |
| 2,513,514 | 7/1950 | Poage . | |
| 2,583,050 | 1/1959 | Harrower . | |

(List continued on next page.)

| | | |
|---|---|---|
| 2,628,602 | 2/1953 | Butterfield . |
| 2,797,589 | 7/1957 | Chaveneaud . |

FOREIGN PATENT DOCUMENTS

| | | |
|---|---|---|
| 336037 | 6/1920 | Germany . |
| 584082 | 9/1930 | Germany . |
| 3607422 | 9/1987 | Germany . |
| 61-241518 | 10/1986 | Japan . |
| 112767 | 10/1918 | United Kingdom . |
| 152799 | 7/1919 | United Kingdom . |
| 533047 | 9/1941 | United Kingdom . |

OTHER PUBLICATIONS

SAE Technical Paper No. 901532, Aitken et al., Aug. 13–16, 1990 The CMC Scotch Yoke Engine—A Family of Engines For Automotive Use.
SAE Technical Paper No. 920675, Close et al, Feb. 24–28, 1992 The New Collins Compact Scotch Yoke Engine.
Popular Science, David Scott, p. 56, Jan. 1990 New Wave.
International Publication No. WO 94/03740 17 Feb. 1994 Douglas C. Brackett.

*Primary Examiner*—Allan D. Herrmann
*Attorney, Agent, or Firm*—Selitto & Associates

[57] ABSTRACT

A motion converter employs a shuttle movable in a reciprocating fashion along a rectilinear path and having an aperture therein. One side of the aperture is defined by a first trackable profile and an opposite side of the aperture is defined by a second trackable profile. A pair of conjugate drivers is rotatably mounted on a crank pin positioned within the aperture of the shuttle. The conjugate drivers have tracking profiles which are in continuous conjugating engagement with the trackable profiles of the shuttle. Each of the tracking profiles has the same circumferential length as its corresponding trackable profile.

7 Claims, 13 Drawing Sheets

U.S. PATENT DOCUMENTS

| | | |
|---|---|---|
| 3,035,793 | 5/1962 | Ralph et al. . |
| 3,087,342 | 4/1963 | Caddell . |
| 3,195,420 | 7/1965 | Johannsen . |
| 3,205,723 | 9/1965 | Erlenbach . |
| 3,332,303 | 7/1967 | Daugherty . |
| 3,365,913 | 1/1968 | Shields . |
| 3,386,429 | 6/1968 | Trammell, Jr. . |
| 3,415,138 | 12/1968 | Rumbarger et al. . |
| 3,424,022 | 1/1969 | Greenberg et al. . |
| 3,789,956 | 2/1974 | Neugebauer . |
| 3,822,607 | 7/1974 | Tharaldsen . |
| 3,827,237 | 8/1974 | Linder et al. . |
| 3,901,100 | 8/1975 | Iida et al. . |
| 3,945,358 | 3/1976 | Collins . |
| 3,961,607 | 6/1976 | Brems . |
| 4,013,048 | 3/1977 | Reitz . |
| 4,073,196 | 2/1978 | Dell . |
| 4,173,845 | 11/1979 | Heesch . |
| 4,270,395 | 6/1981 | Grundy . |
| 4,331,108 | 5/1982 | Collins . |
| 4,339,960 | 7/1982 | Senft . |
| 4,355,542 | 10/1982 | Tsutsumi et al. . |
| 4,370,901 | 2/1983 | Bolen . |
| 4,408,578 | 10/1983 | Konther et al. . |
| 4,459,945 | 7/1984 | Chatfield . |
| 4,463,710 | 8/1984 | McWhorter . |
| 4,485,768 | 12/1984 | Heniges . |
| 4,485,769 | 12/1984 | Carson . |
| 4,512,291 | 4/1985 | Kirk . |
| 4,543,919 | 10/1985 | Carson . |
| 4,565,167 | 1/1986 | Bryant . |
| 4,570,505 | 2/1986 | Peterson . |
| 4,573,373 | 3/1986 | Shimizu et al. . |
| 4,584,972 | 4/1986 | Jayne et al. . |
| 4,590,812 | 5/1986 | Brackett . |
| 4,598,672 | 7/1986 | Jayne et al. . |
| 4,658,768 | 4/1987 | Carson . |
| 4,685,342 | 8/1987 | Brackett ........... 74/50 |
| 4,696,201 | 9/1987 | Hattori et al. . |
| 4,715,326 | 12/1987 | Thring . |
| 4,722,239 | 2/1988 | Fleck et al. . |
| 4,741,220 | 5/1988 | Watanabe et al. . |
| 4,776,229 | 10/1988 | Zona . |
| 4,779,472 | 10/1988 | Brackett . |
| 4,803,890 | 2/1989 | Giuliani et al. . |
| 4,856,917 | 8/1989 | Schroder et al. . |
| 4,884,536 | 12/1989 | Neale . |
| 4,887,560 | 12/1989 | Heniges . |
| 4,905,535 | 3/1990 | Ludwig et al. . |
| 4,915,019 | 4/1990 | Hovagnimian . |
| 4,932,373 | 6/1990 | Carson . |
| 4,977,864 | 12/1990 | Grant . |
| 4,979,427 | 12/1990 | Pfeffer et al. . |
| 4,995,354 | 2/1991 | Morikawa . |
| 5,090,265 | 2/1992 | Slocum . |
| 5,109,728 | 5/1992 | Muszak . |
| 5,259,256 | 11/1993 | Brackett ........... 74/49 |
| 5,265,564 | 11/1993 | Dullaway . |
| 5,351,567 | 10/1994 | Brackett ........... 74/49 |

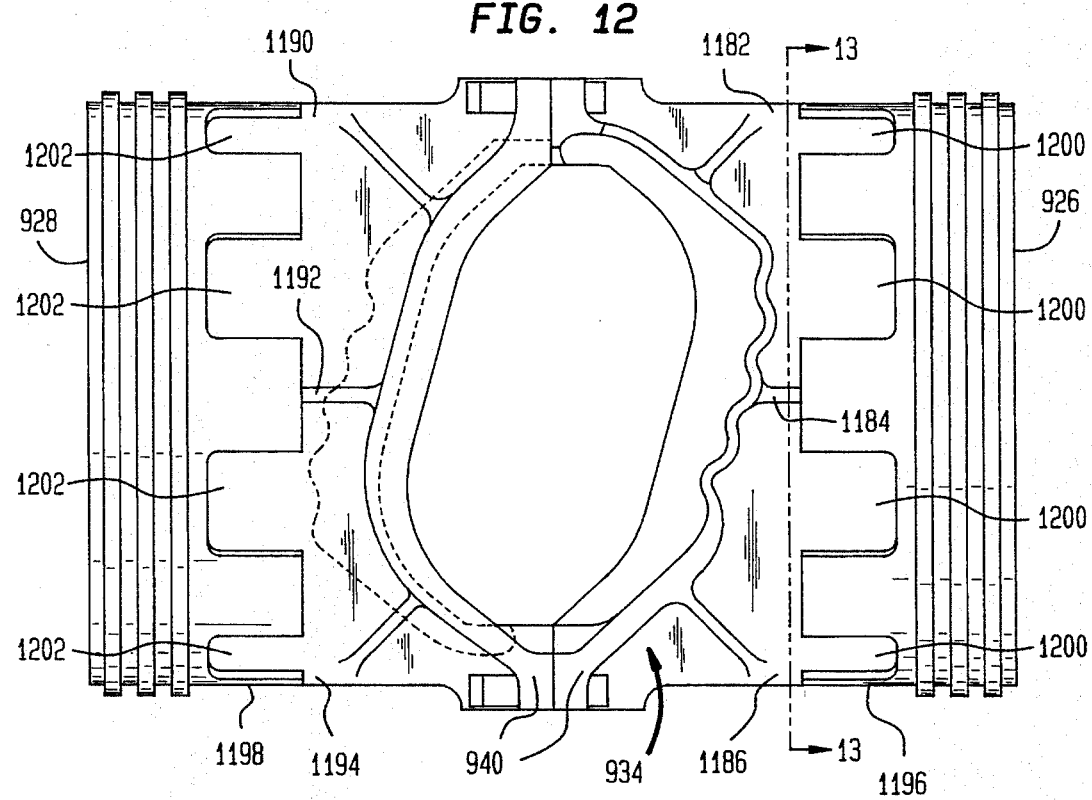
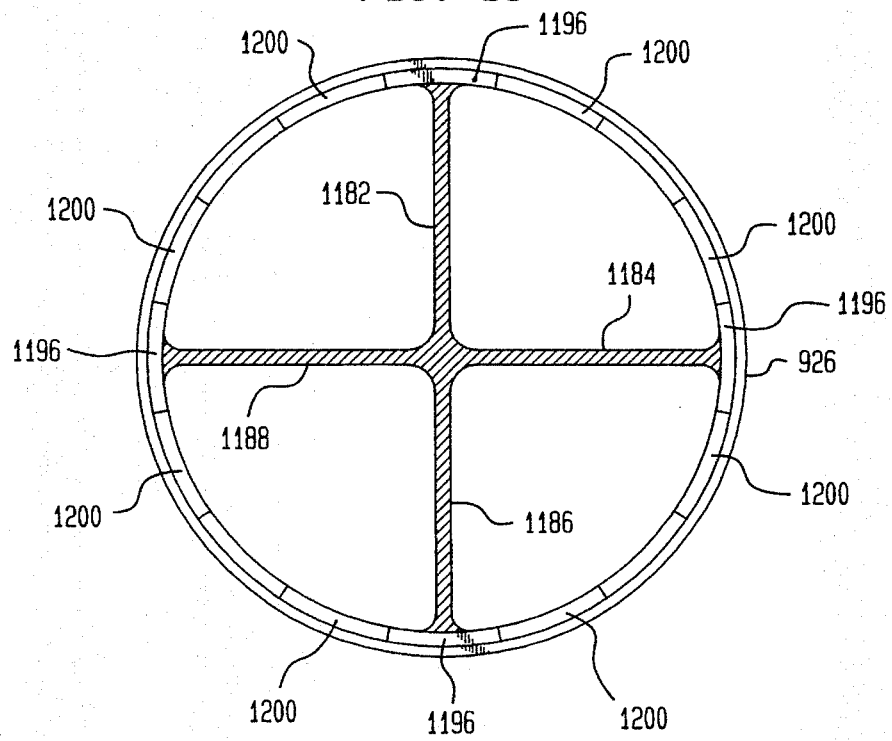

CONJUGATE DRIVE MECHANISM

CROSS REFERENCE TO RELATED APPLICATION

This is a continuation-in-part of application Ser. No. 08/210,875, filed Mar. 18, 1994, now U.S. Pat. No. 5,445,039.

FIELD OF THE INVENTION

The present invention relates to devices for converting linear motion to rotary motion and vice versa, and, more particularly, to a conjugate type device for converting linear motion to rotary motion and vice versa. As used herein, the term "conjugate drive mechanism" shall connote a combination of at least two mechanical components (i.e., a "conjugate driver" and a "bearing conjugate" a/k/a "conjugate bearing") adapted to mesh or engage in conjugation with each other throughout the range of motion of the apparatus, such as through the provision of meshable tracking profiles (i.e., undulations), during the operation of an associated motion converter which functions to convert rotary motion to rectilinear motion and vice versa without any clearance between the mechanical components.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance, at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, clearance and friction at the slot/crankpin interface cause energy inefficiency and excessive wear and tear.

U.S. Pat. No. 4,685,342 to Douglas C. Brackett, the inventor herein, discloses a scotch yoke type motion converter having a pair of opposing, offset bearing surfaces, one on either side of the crankpin slot in the shuttle. A corresponding pair of roller bearings is arranged on the crankpin, the bearing members being coaxially and laterally displaced from one another such that each aligns with a corresponding one of the bearing surfaces of the slot within which the crankpin is positioned. In this manner, clearance at the crankpin/slot interface can be minimized to manufacturing tolerances and friction is reduced to the rolling friction of a roller bearing.

U.S. Pat. No. 5,259,256 to Douglas C. Brackett, the inventor herein, discloses a scotch yoke type motion converter having a pair of opposing gear racks provided with mating profiles, one on each side of a crankpin slot in the shuttle. A corresponding pair of pinion sectors, each of which has a tracking profile, is arranged on a crankpin. The pinion sectors are diametrically opposed to each other such that each of the tracking profiles engages a corresponding one of the mating profiles of the gear racks. In this manner, not only can clearance at the crankpin/slot interface be minimized to manufacturing tolerances, but also the load bearing capacity of the motion converter can be increased due to increased area contact between the gear racks and pinion sectors.

Whereas different motion translation applications have varying requirements with respect to loading stresses, materials, cost, etc., it remains an objective in the art to create new scotch yoke designs having alternative structural and functional characteristics while achieving energy efficiency and wear resistance. It is therefore an object of the present invention to provide an alternative scotch yoke type motion converter which tends to simultaneously minimize clearance and friction between the crankpin and the shuttle slot while maximizing the load bearing capacity of the motion converter.

SUMMARY OF THE INVENTION

The problems and disadvantages associated with conventional scotch yoke type motion converters utilized for translating rotary to linear motion and vice versa are overcome by the present invention which includes a shuttle movable in a reciprocating fashion along a rectilinear path and having an aperture therein. One side of the aperture is defined by a first trackable profile and an opposite side of the aperture is defined by a second trackable profile. The present invention also includes a rotatable crankshaft having a crankpin positioned within the aperture of the shuttle and rotatable in a circular path. A pair of conjugate drivers is rotatably mounted on the crankpin by a corresponding pair of mounting means positioned on opposite sides of an imaginary plane which passes through the crankpin and which is oriented normal to a longitudinal axis of the crankpin. One of the conjugate drivers includes a first tracking profile having the same circumferential length as the first trackable profile, as well as a first profiled portion positioned on one side of the imaginary plane and a second profiled portion positioned on an opposite side of the imaginary plane, whereby the second profiled portion of the first tracking profile overhangs the other of the conjugate drivers. The other conjugate driver includes a second tracking profile having the same circumferential length as the second trackable profile, as well as a first profiled portion positioned on the opposite side of the imaginary plane and a second profiled portion positioned on the one side of the imaginary plane, whereby the second profiled portion of the second tracking profile overhangs the one conjugate driver. The first and second tracking profiles engage the first and second trackable profiles, respectively, in a continuous conjugating manner as the crankpin rotates in the circular path, whereby the reciprocating rectilinear motion of the shuttle is continuously converted into the rotary motion of the crankpin or vice versa.

BRIEF DESCRIPTION OF THE DRAWINGS

For a better understanding of the present invention, reference is made to the following description of an exemplary embodiment of the invention considered in conjunction with the accompanying drawings, in which:

FIG. 12 is a side elevational view of another modified version of the shuttle illustrated in FIGS. 8 and 9;

FIG. 13 is a cross-sectional view, taken along section line 13–18 of FIG. 12 and looking in the direction of the arrows, of the shuttle illustrated in FIG. 12;

DETAILED DESCRIPTION OF THE EXEMPLARY EMBODIMENT

Although the present invention is applicable to any machine which utilizes a conjugate driver as that term will be more fully defined hereinafter, it is particularly suitable for use in connection with a reciprocating piston device, such as an internal combustion engine or a compressor. Accordingly, the present invention will be described hereinafter in terms of its application to a reciprocating piston device. It should be understood, however, that the following description is only meant to be illustrative of the present invention and is not meant to limit the scope of the present invention which has applicability to other types of motion converters.

Figure 1:
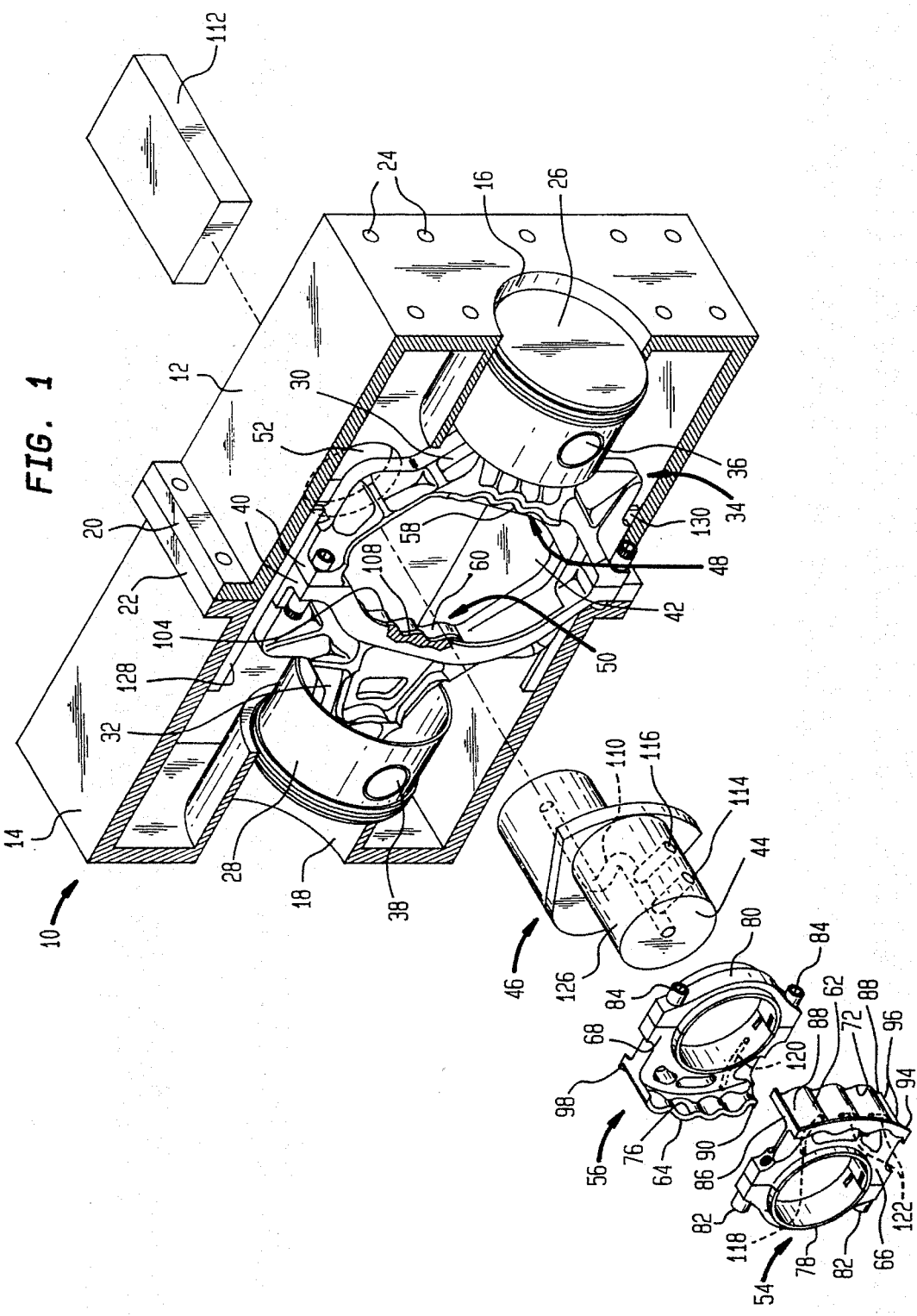
FIG. 1 is an exploded, cutaway, perspective view of a reciprocating piston device constructed in accordance with the present invention.

FIG. 1 shows a piston device 10 with a pair of cylinder blocks 12, 14, each of which has a cylinder bore 16 and 18, respectively. The cylinder blocks 12, 14 would be joined together via opposing flanges 20, 22 by bolts etc. or by studs extending through the blocks and projecting from holes 24 for securing a cylinder head (not shown) via suitable nuts (not shown) as would be conventional in constructing cylinder blocks with opposed cylinders. The cylinder bores 16 and 18 receive corresponding pistons 26 and 28 which are mounted upon the terminal ends of extensions 30 and 32 of a shuttle 34 by wrist pins 36 and 38 or other conventional means. The extensions 30 and 32 emanate from a common yoke portion 40 of the shuttle 34.

The yoke portion 40 is provided with an aperture 42 which accommodates a crankpin 44 of a crankshaft 46. The internal peripheral boundary of the aperture 42, instead of simply being a smooth slot, includes a pair of bearing conjugates 48 and 50 integrated to either side thereof. Alternatively, the bearing conjugates 48, 50 may be a pair of discrete elements, each being bolted to the shuttle 34. It should be appreciated that while the aperture 42 passes completely through the shuttle 34, it is possible to replace the aperture 42 with a recess or blind hole. For example, in the device shown in FIG. 1, if the yoke portion 40 were closed by a continuous metal surface on the side closest to the viewer, a recess facing toward bearing opening 52 would be formed. This recess could accommodate the free end of the crankpin 44. The use of the aperture 42 is beneficial because it permits the crankshaft 46 to project through the shuttle 34, whereby additional bearings and crankpins may be made a part thereof, such as, for example, to cooperate with another set of adjacent pistons.

The crankpin 44 has a pair of conjugate drivers 54, 56 rotatably associated therewith when the crankshaft 46 is in place in the bearing opening 52, as is more clearly shown in FIGS. 2–5. With the crankshaft 46 positioned within the opening 52 and the crankpin 44, including the conjugate drivers 54, 56, positioned within the aperture 42 of the yoke portion 40, the conjugate drivers 54, 56 mesh with the bearing conjugates 48, 50, respectively, which capture the crankpin 44 and the conjugate drivers 54, 56 therebetween. More particularly, the bearing conjugates 48, 50, which include mating profiles (i.e., undulations) 58, 60, respectively, formed on tracking surfaces thereof, and the conjugate drivers 54, 56, which include tracking profiles (i.e., undulations) 62, 64, respectively, formed on tracking surfaces thereof, mesh together in conjugation throughout the range of motion of the piston device 10; and, thus, they cooperate to form a conjugate drive mechanism as that term is defined herein. The crankpin 44 is isolated from contact with the periphery of the yoke portion 40 and instead bears upon bearing portions 66, 68 of the conjugate drivers 54, 56, respectively. As can be appreciated, this arrangement prevents the crankpin 44 from bearing upon the yoke portion 40 directly and permits the fitting of the crankpin 44 to the aperture 42 within manufacturing tolerances.

Figure 7:
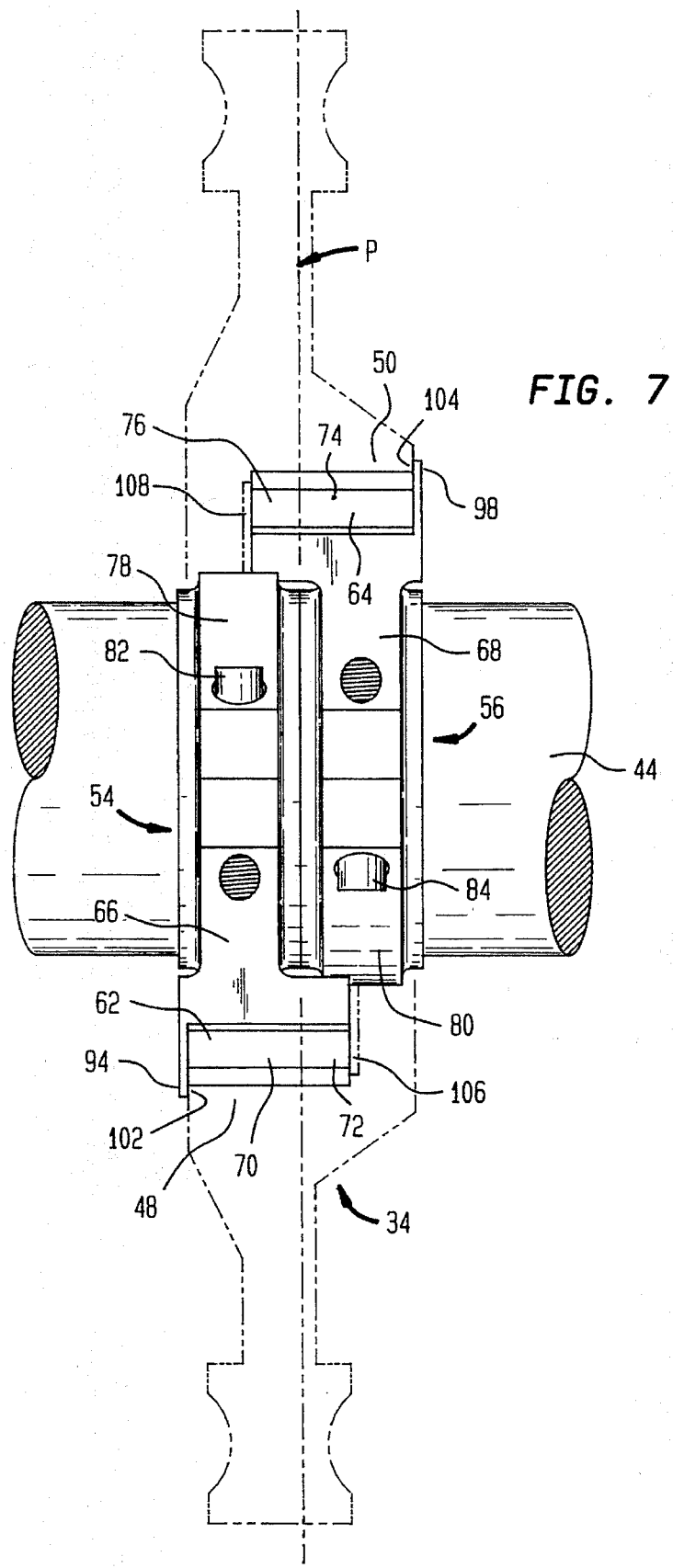
FIG. 7 is a top view showing a pair of conjugate drivers mounted side-by-side on a crankpin, an associated shuttle being shown in phantom.

Referring to FIG. 7, the bearing portions 66, 68 of the conjugate drivers 54, 56, respectively, are positioned alongside each other (i.e., side-by-side) on the crankpin 44. More particularly, the bearing portion 66 of the conjugate driver 54 is placed on a side of an imaginary plane P, which is substantially perpendicular to the axis of the crankpin 44, while the bearing portion 68 of the conjugate driver 56 is placed on an opposite side of the plane P. The tracking profile 62 of the conjugate driver 54 includes an unilateral portion 70 on the side of the plane P where the bearing portion 66 is positioned and an overhanging portion 72 on the other side of the plane P. Similarly, the tracking profile 64 of the conjugate driver 56 incudes an unilateral portion 74 on the side of the plane P where the bearing portion 68 is positioned and an overhanging portion 76 on the other side of the plane P. More specifically, the overhanging portion 72 of the tracking profile 62 overhangs the bearing portion 68 and the unilateral portion 74 of the conjugate drive 56 while the overhanging portion 76 of the tracking profile 64 overhangs the bearing portion 66 and the unilateral portion 70 of the conjugate drive 54. The unilateral portion 70 together with the overhanging portion 72 engages the mating profile 58 of the bearing conjugate 48 while the unilateral portion 74 together with the overhanging portion 76 engages the mating profile 60 of the bearing conjugate 50. Retaining caps 78, 80, respectively, are provided to removably mount the conjugate drivers 54, 56 via bolts 82, 84, respectively, or other conventional means on the crankpin 44 while permitting rotation relative thereto.

Figure 6:
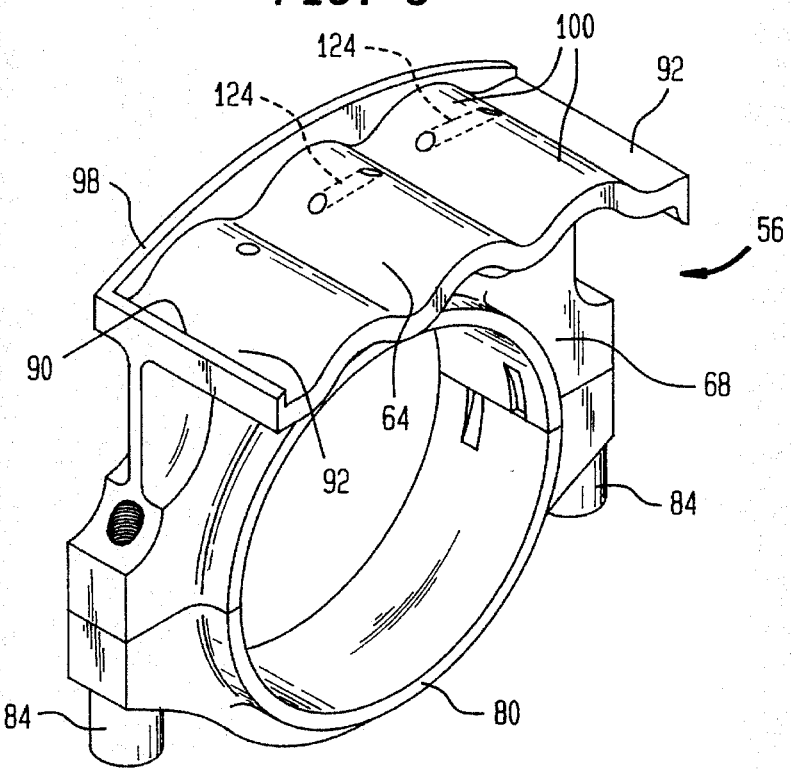
FIG. 6 is a perspective view of a conjugate driver employed by the embodiment illustrated in FIG. 1.

Referring to FIGS. 1 and 6, the tracking profile 62 of the conjugate driver 54 includes an end retaining wall 86 at one of lateral ends 88 thereof while the tracking profile 64 of the conjugate driver 56 includes an end retaining wall 90 at one of lateral ends 92 thereof. Similarly, the tracking profiles 62 also includes a side retaining wall 94 at one of axial ends 96 thereof while the tracking profile 64 includes a side retaining wall 98 at one of axial ends 100 thereof. When the conjugate driver 54 is in engagement with the bearing conjugate 48, at least some portion of the side retaining wall 94 is in engagement with a side portion 102 of the bearing conjugate 48 to assist in guiding the conjugate driver 54 in alignment with the shuttle 34 throughout the range of motion of the piston device 10 (see FIGS. 2–5 and 7), the side portion 102 forming a portion of an outer periphery of the shuttle 34. Likewise, when the conjugate driver 56 is in engagement with the bearing conjugate 50, at least some portion of the side retaining wall 98 is in engagement with a side portion 104 of the bearing conjugate 50 to assist in guiding the conjugate driver 56 in alignment with the shuttle 34 throughout the range of motion of the piston device 10 (see FIG. 7), the side portion 104 forming a portion of an outer periphery of the shuttle 34. It should be noted that the bearing conjugates 48, 50 may be equipped with grooves to receive the end retaining walls 86, 90, respectively.

Referring to FIGS. 1–5 and 7, the bearing conjugate 48 includes a side retaining wall 106 at a side portion thereof opposite the side portion 102 while the bearing conjugate 50 includes a side retaining wall 108 at a side portion thereof opposite the side portion 104. Referring to FIGS. 1 and 7, when the conjugate driver 54 is in engagement with the bearing conjugate 48, at least some portion of the side retaining wall 106 of the bearing conjugate 48 is in engagement with the other axial end 96 of the conjugate driver 54, opposite the axial end 96 where the side retaining wall 94 is positioned, to assist in guiding the conjugate driver 54 in alignment with the shuttle 34 throughout the range of motion of the piston device 10. Likewise, when the conjugate driver 56 is in engagement with the bearing conjugate 50, at least some portion of the side retaining wall 108 of the bearing conjugate 50 is in engagement with the other axial end 100 of the conjugate driver 56, opposite of the axial end 100 where the side retaining wall 98 is positioned, to assist in guiding the conjugate driver 56 in alignment with the shuttle 34 throughout the range of motion of the piston device 10.

It should be noted that the present invention is not intended to be restricted to any particular form of conjugate driver and bearing conjugate. For example, FIGS. 1–5 depict concentric wave-profile conjugate drivers 54, 56 and mating wave-profile bearing conjugates 48, 50 which have a compound curve pitch line, inclined and declined from the perpendicular of the direction of the reciprocating motion of the shuttle 34. The above described patent of the inventor herein, U.S. Pat. No. 5,259,256, discloses a variety of conjugate driver shapes and mating bearing conjugate profiles, which said application is incorporated herein by reference.

Referring to FIG. 1, in order to lubricate the conjugate drive mechanism, the piston device 10 is provided with a lubrication system including a gallery 110 which extends longitudinally through the crankshaft 46 and the crankpin 44 and which forms a conduit for lubricating fluid supplied under pressure from a source, such as a pump 112. The crankpin 42 has bores 114, 116 communicating with the gallery 110 and extending radially outwardly from the gallery 110. The conjugate drivers 54, 56 have orifices 118, 120, respectively, extending therethrough from the bearing portions 66, 68 to the tracking profiles 62, 64, respectively. The orifice 118 is positioned such that it is alignable with the bore 114 as the crankshaft 46 rotates and the conjugate driver 54 pivot about the crankpin 44, for a purpose to be described hereinafter, while the orifice 120 is positioned such that it is alignable with the bore 116 as the crankshaft 46 rotates and the conjugate driver 56 pivot about the crankpin 44, for a purpose to be described hereinafter. Referring to FIGS. 1 and 6, the conjugate drivers 54, 56 are provided with a plurality of channels 122, 124, respectively, interconnecting valleys of the undulations thereof, for purposes to be discussed hereinafter.

Figure 2:
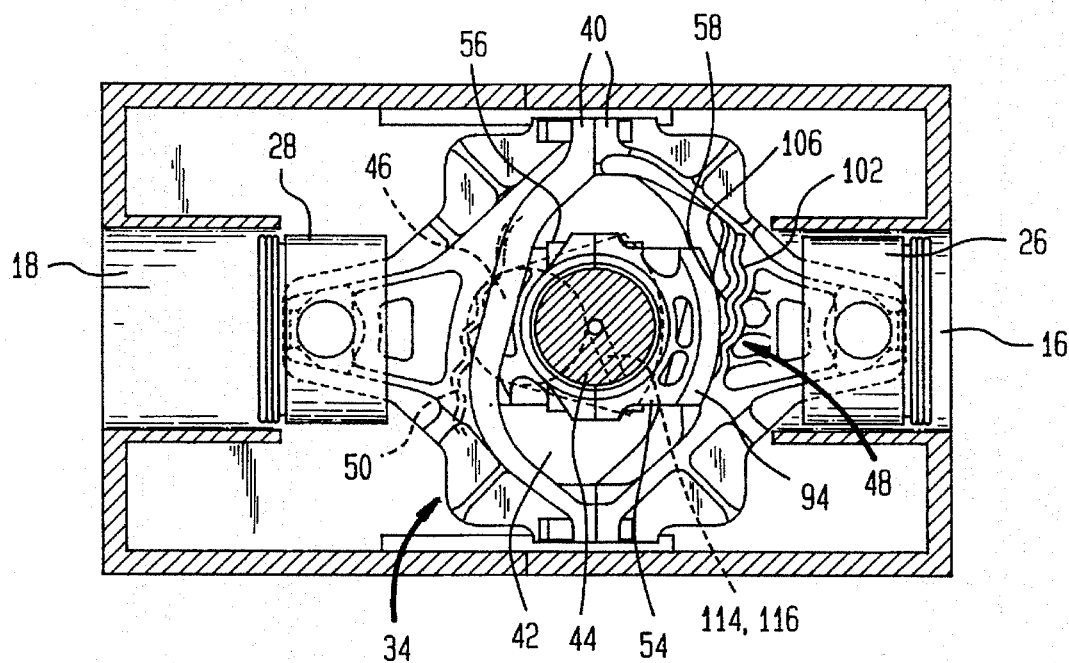
FIGS. 2–5 are a series of schematic elevational views of the embodiment illustrated in FIG. 1 as it is moved through a portion of its range of motion.
Figure 3:
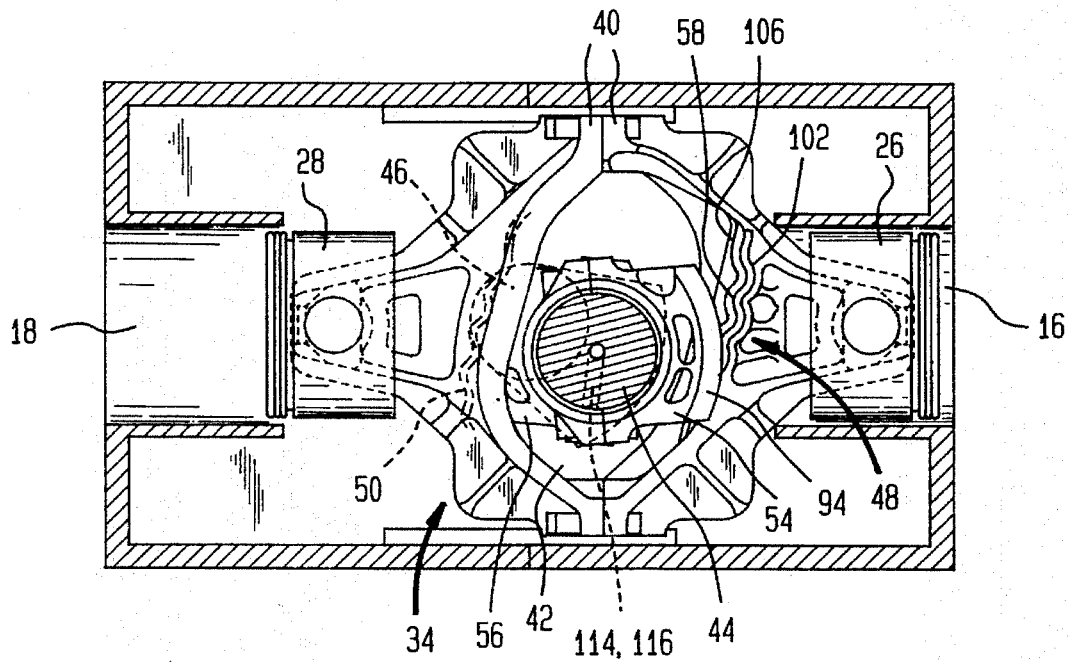
Figure 4:
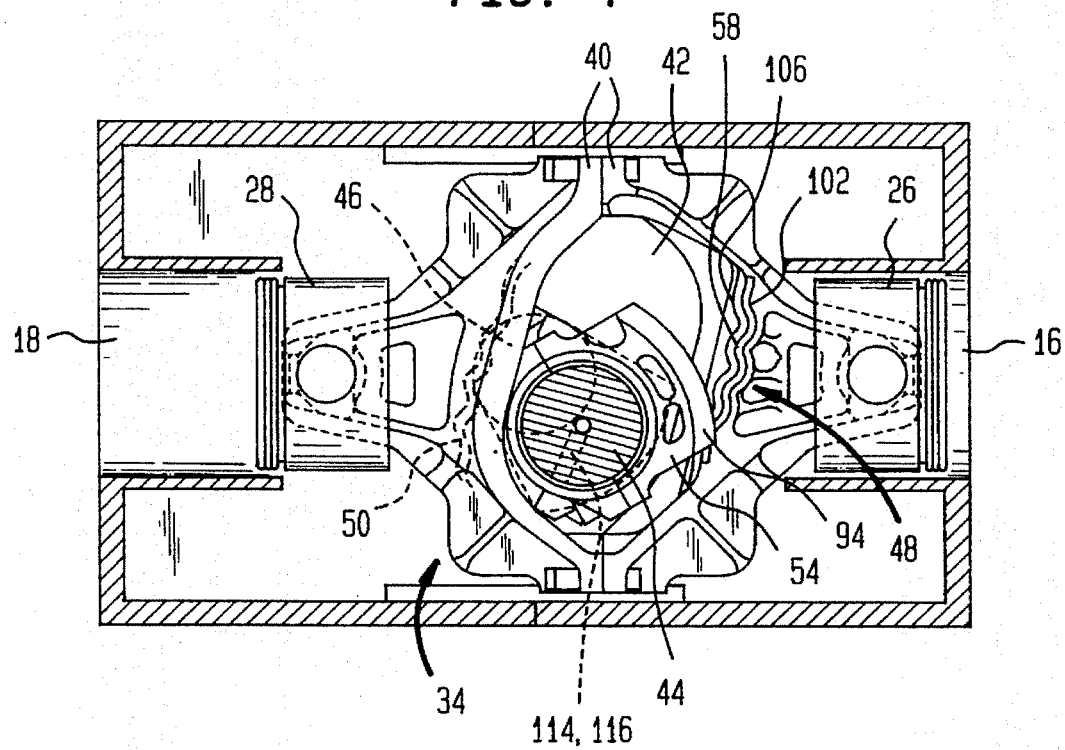
Figure 5:
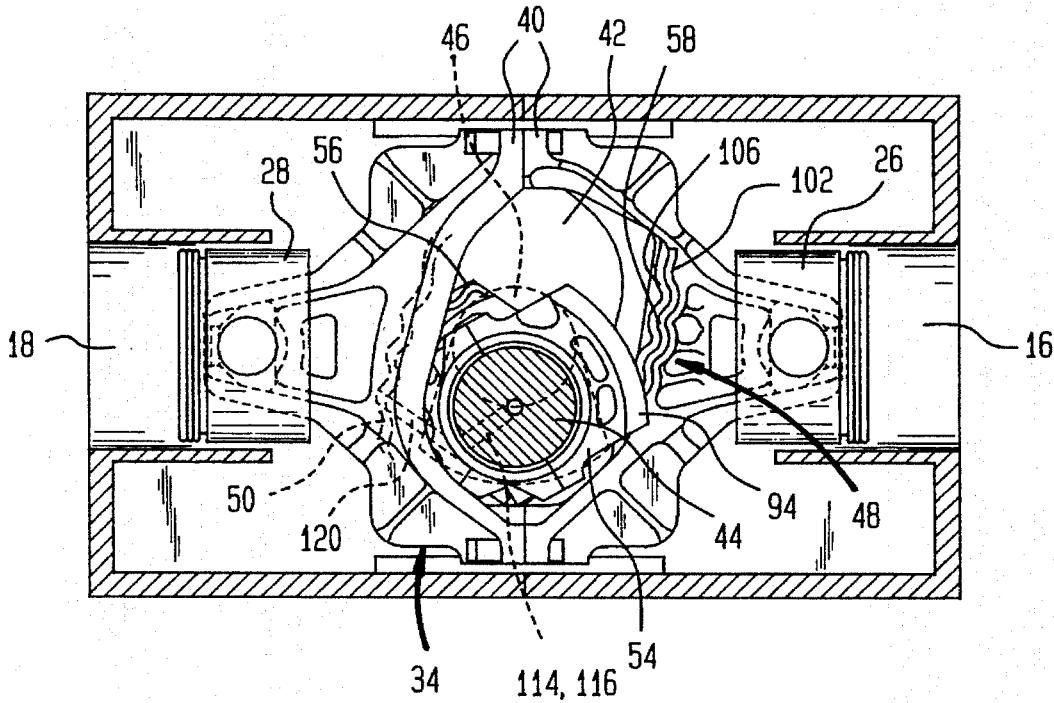

The operation of the present invention is similar to the operation of an engine constructed in accordance with the teachings of applicant's copending U.S. patent application Ser. No. 08/149,032, filed Nov. 8, 1993, the specification of which is incorporated herein by reference. FIGS. 2–5 show the present invention at four different positions during the travel of the crankshaft 46 through 90 degrees of rotation. FIG. 2 shows the crankpin 44 at 0 or 360 degrees relative to the axis of the cylinders 16, 18. FIG. 3 shows the crankpin 44 at 30 degrees beyond the axis of the cylinders 16, 18. In FIG. 4, the crankpin 42 is at 60 degrees beyond the axis, and, in FIG. 5, the crankpin 44 has progressed 90 degrees beyond the axis.

As the crankshaft 46 rotates, the crankpin 44 moves up and down within the yoke portion 40 relative to the axis of the cylinders 16, 18 (i.e., in a vertical direction). The horizontal component of crankpin 44 motion is translated into the rectilinear motion of the shuttle 34. The crankpin 44 is captured by the bearing portions 58, 60 of the conjugate drivers 54, 56 and is therefore prevented from contacting the interior periphery of the aperture 42. The conjugate drivers 54, 56 pivot about the crankpin 44 as the crankshaft 46 rotates, the bearing conjugates 48, 50 being immovable in the direction perpendicular to the linear path of the shuttle 34 and the pistons 26, 28. The conjugate drivers 54, 56 pivot in opposite directions and can therefore be said to be counter-rotating. The crankpin 44, assuming that it has an axial offset "r" from the crankshaft 46, causes a reciprocating linear motion of the shuttle of magnitude 2r, ranging from −r to +r.

As the crankshaft 46 rotates, the lubricating fluid travels through the gallery 110, is diverted to an outer surface 126 of the crankpin 44 through the bore 114 lubricating the interface between the outer surface 126 of the crankpin 44 and the bearing portion 66 of the conjugate driver 54 and through the bore 116 lubricating the interface between the outer surface 126 of the crankpin 44 and the bearing portion 68 of the conjugate driver 56. As the orifice 120 of the conjugate driver 56 comes into alignment with the bore 116 (see FIG. 5), lubricating fluid flows from the bore 116 into the orifice 120. As the mating profile 60 of the bearing conjugate 50 engages the tracking profile 64 of the conjugate driver 56, the mating profile 60 pushes a portion of lubricating fluid, which is conveyed through the orifice 120 to an area on the tracking profile 64 adjacent to the orifice 120, into the channels 124 and, thereby, induces the transfer of lubricating fluid to other areas of the tracking profile 64 remote from the area adjacent to the orifice 120. In this way, the entire interface between the tracking profile 64 of the conjugate driver 56 and the mating profile 60 of the bearing conjugate 50 is effectively and efficiently lubricated.

As the crankshaft 46 continues its rotating motion, the bore 114 comes into alignment with the orifice 118 of the conjugate driver 54 so that lubricating fluid flows from the bore 114 into the orifice 118. As the mating profile 58 of the bearing conjugate 48 engages the tracking profile 62 of the conjugate driver 54, the mating profile 58 pushes a portion of lubricating fluid, which is conveyed through the orifice 118 to an area on the tracking profile 62 adjacent to the orifice 118, into the channels 122 and, thereby, induces the transfer of lubricating fluid to other areas of the tracking profile 62 remote from the area adjacent to the orifice 118. In this way, the entire interface between the tracking profile 62 of the conjugate driver 54 and the mating profile 58 of the bearing conjugate 48 is effectively and efficiently lubricated. The conjugate drive mechanism described above provides several functional advantages over a roller bearing riding upon a flat surface or traditional gear shapes that otherwise might be used to intermediate between the crank and shuttle. As shall be described in further detail hereinbelow, the mating profiles 58, 60 of the bearing conjugates 48, 50, respectively, and the tracking profiles 62, 64 of the conjugate drivers 54, 56, respectively, substantially increase the area of contact between the conjugate drivers 54, 56 and the bearing conjugates 48, 50 over the line contact of a roller bearing (or wheel) on a flat, hard surface. In addition, the overhanging portions 72, 76 of the tracking profiles 62, 64, respectively, further increase the area of contract between the conjugate drivers 54, 56 and the bearing conjugates 48, 50, respectively. Thus, the present invention has the capacity to endure greater normal loading forces, thereby increasing its power density. The wave-profile arrangement depicted herein can support greater loading forces directed along a line perpendicular to the pitch line than gear shapes which are intended to transfer torsional forces acting parallel to the pitch line.

The lubrication system described herein reduces friction at the interface between the bearing conjugates 48, 50 and the conjugate drivers 54, 56, respectively, and between the crankpin 44 and the conjugate drivers 54, 56, respectively. It should be appreciated that the lubrication system also contributes in minimizing backlash by creating a thin film of lubricating fluid between the conjugate drivers 54, 56 and the bearing conjugates 48, 50, respectively, thereby compensating for inadvertent gaps and spaces resulting from manufacturing tolerances and/or wear and tear of the conjugate drive mechanism.

It should also be appreciated that the end retaining walls 86, 90 and side retaining walls 94, 98 of the conjugate drivers 54, 56, respectively, and the side retaining walls 106, 108 of the bearing conjugates 48, 50, respectively, further contribute in minimizing backlash, brinelling, spalling and vibration. The side retaining wall 94 and the end retaining wall 86 of the conjugate driver 54 and the side retaining wall 106 of the bearing conjugate 48 cooperate to form a labyrinth enclosure, while the side retaining wall 98 and the end retaining wall 90 of the conjugate driver 56 and the side retaining wall 108 of the bearing conjugate 50 cooperate to form a labyrinth enclosure. The labyrinth enclosures temporarily collect and retain lubricating fluid therein to create a pooling effect by forming a hydrostatic cushion of lubricating fluid between the mating profile 58 of the bearing conjugate 48 and the tracking profile 62 of the conjugate driver 54 and between the mating profile 60 of the bearing conjugate 50 and the tracking profile 64 of the conjugate driver 56. The hydrostatic cushion created by the labyrinth enclosures results in minimized physical contact between the mating profile 58 of the bearing conjugate 48 and the tracking profile 62 of the conjugate driver 54 and between the mating profile 60 of the bearing conjugate 50 and the tracking profile 64 of the conjugate driver 56.

It should also be noted that the end retaining walls 86, 90 may be designed in such a way that they function as motion arresters in accordance with the teachings of applicant's copending U.S. patent application Ser. No. 08/148,492, filed Nov. 8, 1993, now U.S. Pat. No. 5,351,567 the specification of which is incorporated herein by reference. Thus, the end retaining wall 86 may function to arrest the motion of the conjugate driver 54 within a pre-defined range of motion of the conjugate driver 54 relative to the bearing conjugate 48 about the crankpin 44, the range being delimited by two end points, the two end points being defined when the lateral ends 88 of the conjugate driver 54 engage the mating profile 58 of the bearing conjugate 48. Likewise, the end retaining wall 90 may function to arrest the motion of the conjugate driver 56 within a pre-defined range of motion of the conjugate driver 56 relative to the bearing conjugate 50 about the crankpin 44, the range being delimited by two end points, the two end points being defined when the lateral ends 92 of the conjugate driver 56 engage the mating profile 60 of the bearing conjugate 50. In other words, the end retaining wall 86 inhibits the conjugate driver 54 from moving beyond one of its end points, while the end retaining wall 90 inhibits the conjugate driver 56 from moving beyond one of its end points. As a result, the end retaining walls 86, 90 reduce backlash and scuffing when the conjugate drivers 54, 56 reach such end points.

After all variations of the present invention are considered below, it should be apparent that the bearing conjugates 48, 50 and the conjugate drivers 54, 56 can be configured in a variety of ways. In each instance, however, it is an objective to prevent scuffing, to minimize backlash and to provide an adequate load bearing support surface. Scuffing of the surfaces is avoided when the tracking profiles 62, 64 of the conjugate drivers 54, 56, respectively, track along the mating profiles 58, 60 of the bearing conjugates 48, 50, respectively, without loss of contact or slippage throughout the range of motion of the device. In addition, one can observe that the total circumferential length of the mating profiles 58, 60 of the bearing conjugates 48, 50, respectively, equals the total circumferential length of the tracking profiles 62, 64 of the corresponding conjugate drivers 54, 56, respectively.

The bearing conjugates 48, 50 and the conjugate drivers 54, 56 may be formed of hardened steel or other materials as commonly used to form gears and may include surface treatments to reduce wear, friction and production costs (e.g., electroplating, nitriding, spray dispersement and, in general, any known metallurgical or coating process). The weight of the bearing conjugates 48, 50 and conjugate drivers 54, 56 could be reduced by forming them as a multi-material matrix of aluminum and steel or other metal or non-metal matter. The bearing portions 62, 64 of the conjugate drivers 54, 56 may be similarly enhanced by surface treatment or bonding with a friction-reducing bearing material. Furthermore, the mating profiles 58, 60 of the bearing conjugates 48, 50, respectively, and/or tracking profiles 62, 64 of the conjugate drivers 54, 56, respectively, can be lapped (e.g., by roughing the mating profiles 58, 60 and/or tracking profiles 62, 64 so as to provide them with microscopic pores) such that lubricating fluid supplied though the orifices 118, 120, respectively, can readily adhere to the mating profiles 58, 60 and/or the tracking profiles 62, 64 to create a thin film of lubricating fluid between the mating profiles 58, 60 and the tracking profiles 62, 64, respectively.

It should be apparent that the lubrication system also can be configured in various alternative ways. For example, the orifices 118, 120 may communicate with the valleys of the undulations of the tracking profiles 62, 64, rather than with their peaks as shown in FIGS. 1 and 6. The orifices 118, 120 may also extend through the conjugate drivers intermediate the opposed lateral ends 88, 92 of the conjugate drivers 54, 56, respectively, rather than adjacent one of the lateral ends 88, 92, as shown in FIGS. 1 and 6. In addition, the lubrication system can be configured in such a way that a continuous, rather than intermittent, flow of lubricating fluid is provided to the interfaces between the conjugate drivers 54, 56, respectively, and the bearing conjugates 48, 50, respectively, or in such a way that the interface between the conjugate driver 54 and the bearing conjugate 48 and the interface between the conjugate driver 56 and the bearing conjugate 50 are lubricated simultaneously, rather than sequentially.

One should further note that the shuttle 34 is confined to a rectilinear path by the cylinders 16, 18 and the pistons 26, 28. In addition, independent guides 128, 130 may act upon the shuttle 34 proximate the yoke portion 40 to further insure the rectilinear motion of the shuttle 34 and to relieve the pistons 26, 28 and cylinders 16, 18 from undesired side loading forces. However, the shuttle 34 may be confined to a rectilinear path only by the cylinders 16, 18 and the pistons 26, 28. Furthermore, the tracking profiles 62, 64 of the conjugate drivers 54, 56, respectively, act as self-aligning interfaces as they mesh with their respective bearing conjugates 48, 50. Of course, the motion conversion apparatus of the present invention could be used on any application requiring conversion between rotary and linear reciprocating motion and, on those applications not requiring pistons, the guides 128, 130 may be provided.

The shuttle 34 may also be formed of hardened steel or other materials as commonly used to form shuttles. The weight of the shuttle 34 could be reduced by forming them as a multi-material matrix of aluminum and steel or other metal or non-metal matter.

Figure 8:
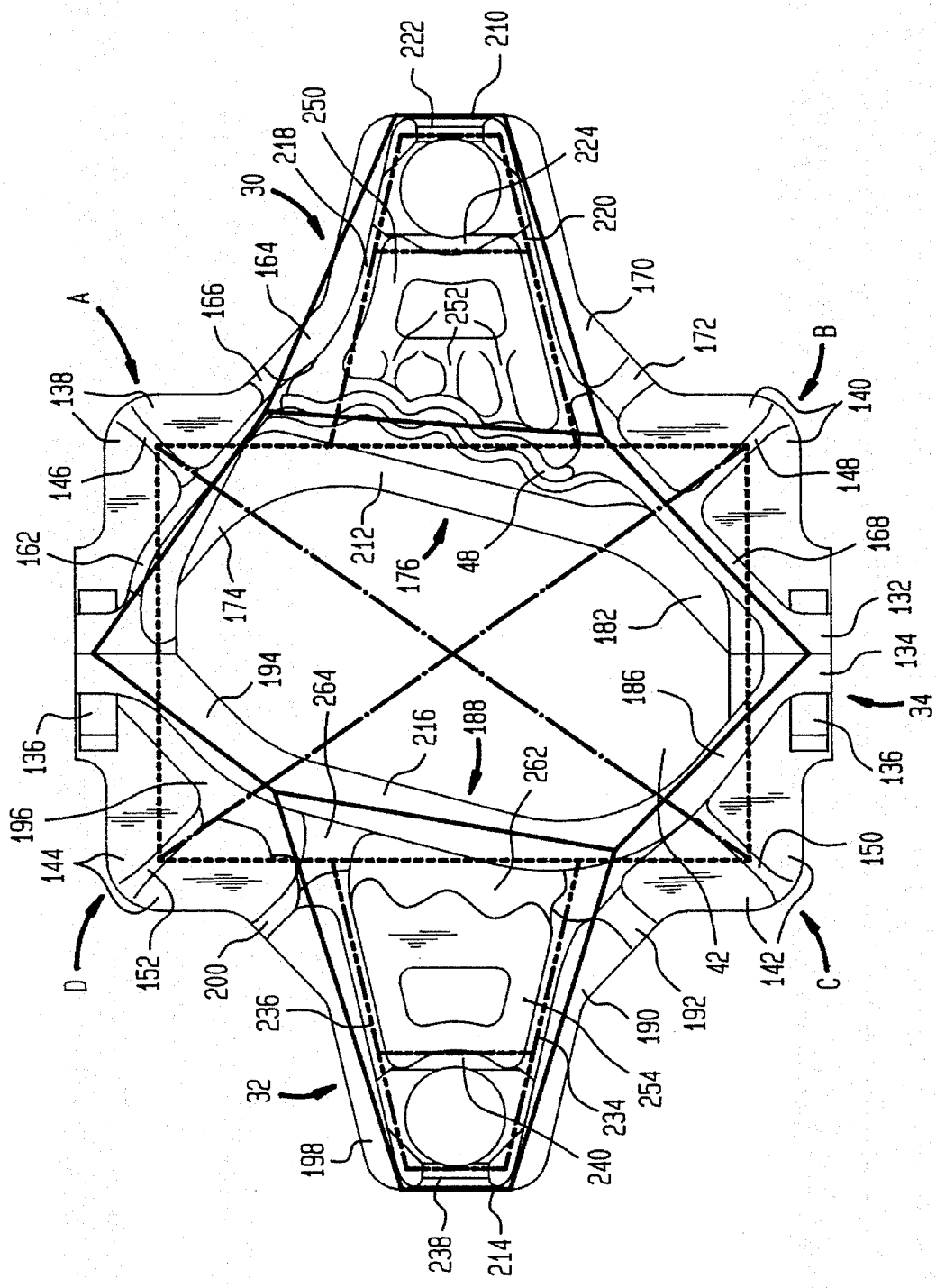
FIG. 8 is a side elevational view of a shuttle employed by the embodiment illustrated in FIG. 1.
Figure 9:
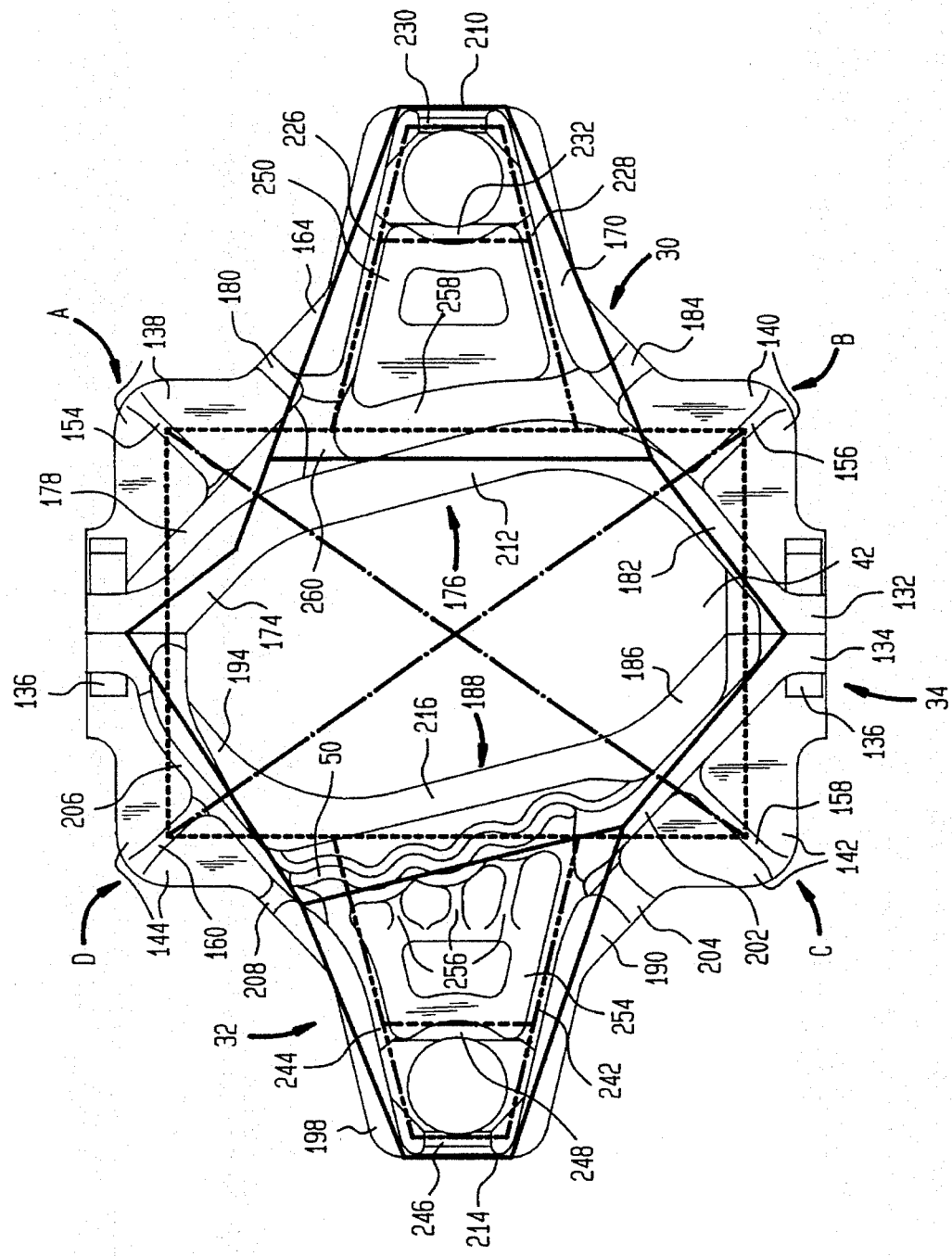
FIG. 9 is an opposite side elevational view of the shuttle shown in FIG. 8.

Referring to FIGS. 8 and 9, the shuttle 34 is constructed of ribs and webs forming a plurality of frames on a pair of subunits 132, 134, securely connected by bolts 138 or any other conventional means, to reinforce the shuttle 34 and to thereby increase the load bearing capacity of the shuttle 34. The shuttle 34 has a box frame (illustrated by broken lines of equal length), positioned at the yoke portion 40 thereof and between front and rear sides thereof, the front side (being shown in FIG. 8) facing the open side of the piston device 10 shown in FIG. 1, the rear side (being shown in FIG. 9) facing the closed side of the piston device 10 shown in FIG. 1. The box frame is defined by a plurality of webs 138, 140, 142, 144, each of the webs 138, 140, 142, 144 defining one of the corners of the box frame (indicated by arrows A, B, C and D, respectively).

The shuttle 34 also includes a pair of partial X frames (illustrated by alternating dots and lines) at the yoke portion 40 thereof. One of the partial X frames (see FIG. 8) is positioned between the box frame and the front side, the one partial X frame being defined by ribs 146, 148, 150, 152. The rib 146 extends from the web 138 to the front side, the rib 148 extends from the web 140 to the front side, the rib 150 extends from the web 142 to the front side, and the rib 152 extends from the web 144 to the from side. Another partial X frame (see FIG. 9) is positioned between the box frame and the rear side and is defined by ribs 154, 156, 158, 160. The rib 154 extends from the web 138 to the rear side, the rib 156 extends from the web 140 to the rear side, the rib 158 extends from the web 142 to the rear side, and the rib 160 extends from the web 144 to the rear side.

The shuttle 34 further includes a plurality of large A flames (illustrated by solid lines). One of the large A flames (see FIG. 8) is positioned on the subunit 132 and includes a pair of legs. One leg is defined by a rib 162 connected to the web 138 and the rib 146 and defining a portion of the aperture 42 and by a web 164 on an outer periphery of the terminal end of the extension 30, the rib 162 being connected to a rib 166 which interconnects the web 138 and the web 164. The other leg is defined by a rib 168 connected to the web 140 and the rib 148 and defining a portion of the aperture 42 and by a web 170 on the outer periphery of the terminal end of the extension 30, the rib 168 being connected to a rib 172 which interconnects the web 140 and the web 170.

Another large A frame (see FIG. 9) is positioned on the subunit 132 and includes a pair of legs. One leg is defined by an end 174 of a web 176 defining a portion of the aperture 42, the end 174 being connected to a rib 178 which is connected to the web 138 and the rib 154, and by the web 164 connected to a rib 180 which is connected to the web 138 and the rib 178. The other leg is defined by an another end 182 of the web 176 connected to the web 140 and the rib 156 and by the web 170 on the outer periphery of the terminal end of the extension 30, the web 170 being connected to a rib 184 which is connected to the web 140.

Another large A frame (see FIG. 8) is positioned on the subunit 134 and includes a pair of legs. One leg is defined by an end 186 of a web 188 defining a portion of the aperture 42, the end 186 being connected to the web 142 and the rib 150, and a web 190 on an outer periphery of the terminal end of the extension 32, the web 190 being connected to a rib 192 which is connected to the web 142. The other leg is defined by an another end 194 of the web 188, the end 194 being connected to a rib 196 which is connected to the web 144 and the rib 152, and by a web 198 on the outer periphery of the terminal end of the extension 32, the rib 198 being connected to a rib 200 which is connected to the web 144.

Another large A frame (see FIG. 9) is positioned on the subunit 134 and includes a pair of legs. One leg is defined by a rib 202 connected to the web 142 and the rib 158 and defining a portion of the aperture 42 and by the web 190 connected to a rib 204 which is connected to the web 142. The other leg is defined by a rib 206 connected to the web 144 and the rib 160 and defining a portion of the aperture 42 and by the web 198 on the outer periphery of the terminal end of the extension 32, the web 198 being connected to a rib 208 which is connected to the web 144.

The large A flame which is positioned on the subunit 132 (see FIG. 8) includes an exterior roof which is defined by a web 210 formed on the outer periphery of the terminal end of the extension 30, the web 210 connecting the web 164 and the web 170, and an intermediate roof which is defined by the bearing conjugate 48. The large A frame which is positioned on the subunit 132 (see FIG. 9) includes an exterior roof which is defined by the web 210 and an intermediate roof which is defined by a middle portion 212 of the web 176. The large A frame which is positioned on the subunit 134 (see FIG. 8) includes an exterior roof which is defined by a web 214 formed on the outer periphery of the terminal end of the extension 32, the web 214 connecting the web 190 and the web 198, and an intermediate roof which is defined a middle portion 216 of the web 188. The large A frame which is positioned on the subunit 134 (see FIG. 9) includes an exterior roof which is defined by the web 214 and an intermediate roof which is defined by the bearing conjugate 50.

The shuttle also includes a plurality of small A flames (illustrated by alternating sequence of two short lines and a long line). One of the small A flames (see FIG. 8) is positioned on the terminal end of the extension 30. This small A frame has a pair of legs defined by ribs 218, 220 which are connected to the webs 164, 170, respectively, an exterior roof defined by a rib 222 connected to the web 210 and an intermediate roof defined by a rib 224 interconnecting the webs 164, 170.

Another small A frame (see FIG. 9) is positioned on the terminal end of the extension 30. This small A frame has a pair of legs defined by ribs 226, 228 which are connected to the webs 164, 170, respectively, an exterior roof defined by a rib 230 connected to the web 210 and an intermediate roof defined by a rib 232 interconnecting the webs 164, 170.

Another small A frame (see FIG. 8) is positioned on the terminal end of the extension 32. This small A frame has a pair of legs defined by ribs 234, 236 which are connected to the webs 190, 198, respectively, an exterior roof defined by a rib 238 connected to the web 214 and an intermediate roof defined by a rib 240 interconnecting the webs 190, 198.

Another small A frame (see FIG. 9) is positioned on the terminal end of the extension 32. This small A frame has a pair of legs defined by ribs 242, 244 which are connected to the webs 190, 198, respectively, an exterior roof defined by a rib 246 connected to the web 214 and an intermediate roof defined by a rib 248 interconnecting the webs 190, 198.

In addition to the frames, the shuttle 34 has ribs and webs which function to further reinforce the shuttle 34. For example, a web 250 positioned between the ribs 218, 220 (see FIG. 8), between the ribs 226, 228 (see FIG. 9) and between the rib 224 and the bearing conjugate 48 includes a plurality of ribs 252 connected to the bearing conjugate 48 for reinforcing the bearing conjugate 48. A web 254 positioned between the ribs 234, 236 (see FIG. 8), between the ribs 242, 244 (see FIG. 9) and between the rib 240 and the bearing conjugate 50 includes a plurality of ribs 256 connected to the bearing conjugate 50 for reinforcing the bearing conjugate 50. A rib 258 (see FIG. 9) is positioned between the webs 176, 250 and connected to the webs 176, 250. A rib 260 (see FIG. 9) interconnects the ribs 178, 258 and is connected to the ribs 180, 226. A rib 262 (see FIG. 9) is positioned between the webs 188, 254 and connected to the webs 188, 254. A rib 264 (see FIG. 9) interconnects the ribs 196, 262 and is connected to the ribs 200, 236.

It should be apparent that the rib/web construction of the shuttle 34 can be configured in a variety of ways, and the present invention is not limited to any particular form of the rib/web construction. For example, the ribs and/or webs which are connected to each other may be integrated with each other. In each instance, however, the objective of the rib/web construction of the shuttle 34 is to provide an adequate load bearing support for the shuttle 34.

Figure 10:
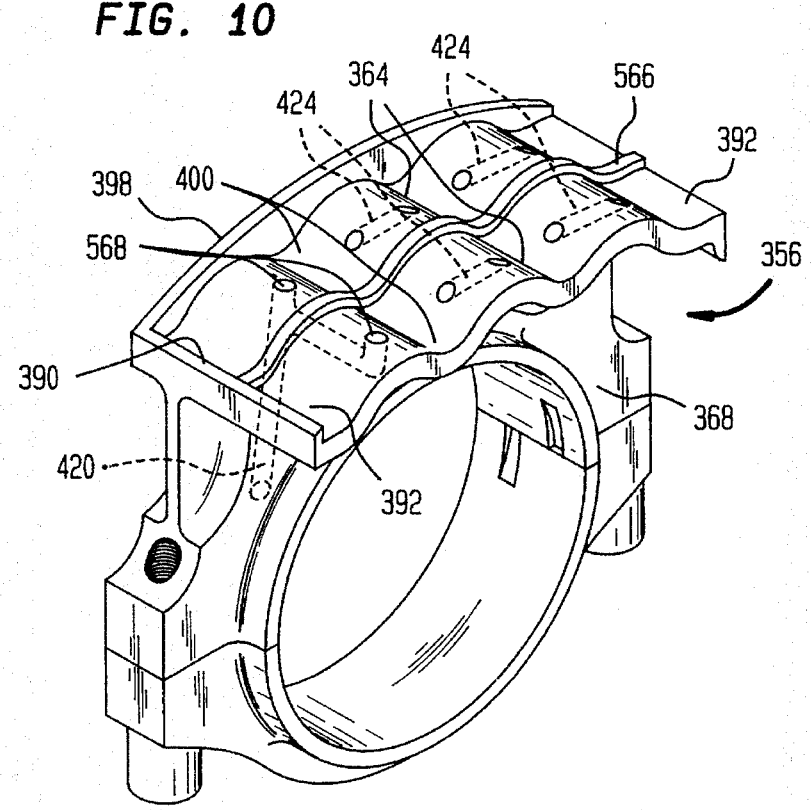
FIG. 10 is a perspective view of a modified version of the conjugate driver illustrated in FIG. 6.
Figure 11:
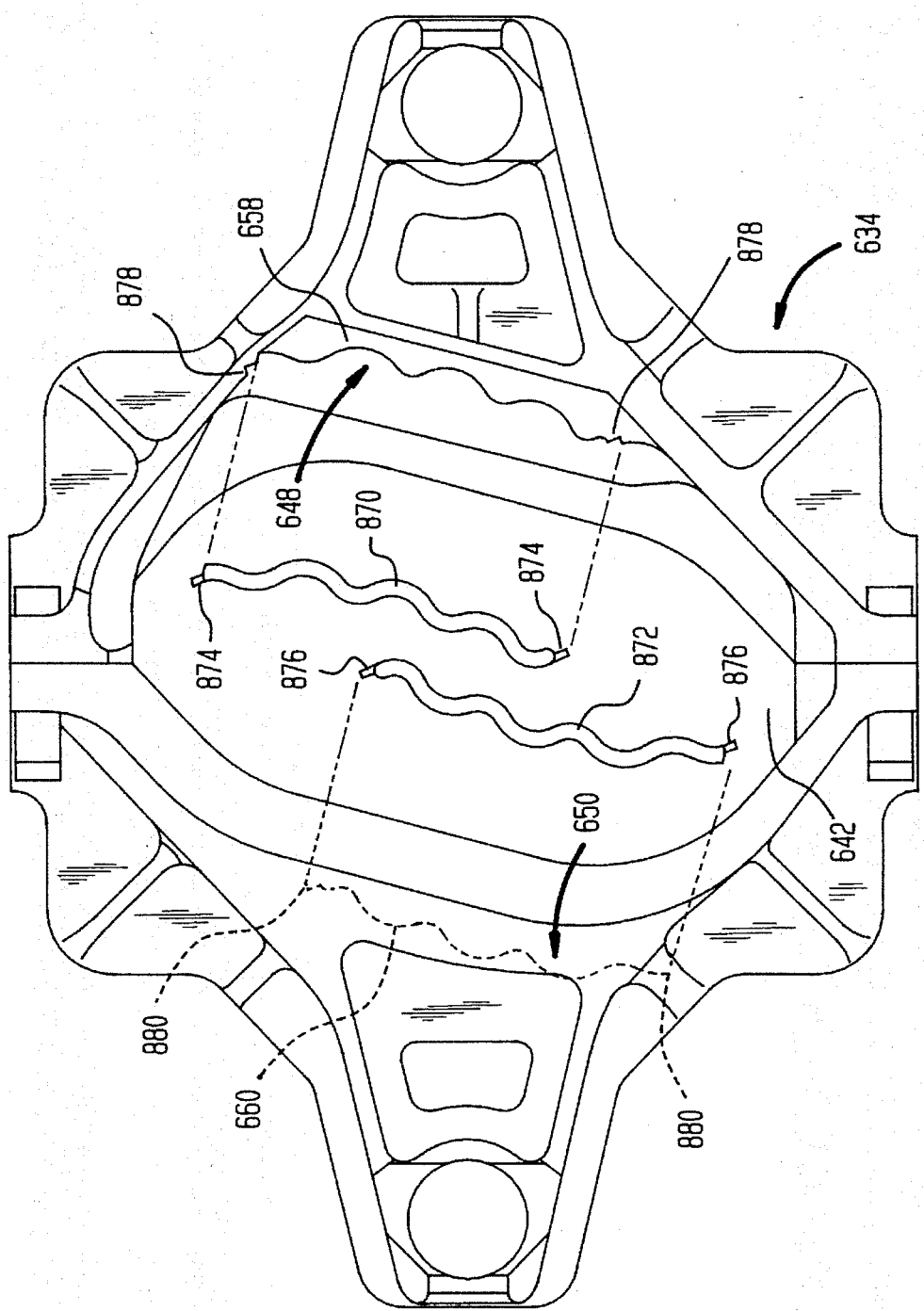
FIG. 11 is a partially exploded, side elevational view of a modified version of the shuttle illustrated in FIGS. 8 and 9.

FIG. 10 shows a modified version of the conjugate driver illustrated in FIGS. 1–7. FIG. 11 shows a modified version of the shuttle shown in FIGS. 1–5, 8 and 9, while FIGS. 12 and 13 show a modified version of the shuttle shown in FIGS. 1–5, 8 and 9. In FIGS. 10–13, a numbering convention is employed wherein elements shown therein having a function or structure in common with a counterpart in previously discussed in FIGS. 1–9 are given the same number incremented by 300 in each succeeding embodiment.

Referring to FIG. 10, a tracking profile 364 of a conjugate driver 356 includes an end retaining wall 390 at one of lateral ends 392 thereof, while an associated bearing conjugate (not shown) is equipped with a groove to receive the end retaining wall 390. The tracking profile 364 of the conjugate driver 356 also includes a side retaining wall 398 at one of two opposed axial ends 400 such that when the conjugate driver 356 is in engagement with the associated bearing conjugate, at least some portion of the side retaining wall 398 is in engagement with a side of the associated bearing conjugate to guide the conjugate driver 356 in alignment with an associated shuttle throughout the range of motion of a piston device.

The conjugate driver 356 also includes an intermediate side retaining wall 566, positioned intermediate the opposed axial ends 400 of the conjugate driver 356 while the associated bearing conjugates includes a complimentarily shaped groove to receive the intermediate side retaining wall 566. A pair of outlets 568 for conveying lubricating fluid from an orifice 420 to a tracking profile 364 of the conjugate driver 356 as the conjugate driver 356 rotates about a crankpin (not shown), the orifice 420 extending from a bearing portion 368 of the conjugate driver 356 to the tracking profile 364, is formed on the tracking profile 364, one on each side adjacent to the intermediate side retaining wall 566. In addition, the conjugate driver 356 also includes a plurality of channels on each side adjacent to the intermediate side retaining wall 566, the channels interconnecting valleys of undulations of the tracking profile 364.

A pair of labyrinth enclosures are formed on the tracking profile 366, one of the enclosures being defined by the side retaining wall 398, the intermediate side retaining wall 566 and the end retaining wall 390, while another of the enclosures is defined by the intermediate side retaining wall 566, the end retaining wall 390 and a side retaining wall of the associated bearing conjugate. This double labyrinth enclosure configuration of the conjugate driver 356 enhances a pooling effect whereby lubricating fluid is temporarily collected in and retained by the enclosures to form a hydrostatic cushion of lubricating fluid between a mating profile of the associated bearing conjugate and the tracking profile 364 of the conjugate driver 356 such that physical contact between the mating profile of the associated bearing conjugate and the tracking profile 364 of the conjugate driver 356 is minimized.

It should be apparent that the conjugate driver 356 and its associated bearing conjugate can be configured in a variety of ways. For example, the tracking profile 364 may have a pair of side retaining walls, one on each of the opposed axial ends 400 thereof. The conjugate driver 356 may also be equipped with a pair of end retaining walls formed on the opposed lateral ends 392 of the tracking profile 364 to further increase the pooling effect described above and to thereby further minimize backlash. In addition, one or more intermediate end retaining walls may be placed on the tracking profiles 364 of the conjugate driver 356, intermediate the opposed lateral ends 392 of the tracking profile 364, while the associated bearing conjugate is equipped with one or more grooves to receive the end retaining walls.

Referring to FIG. 11, bearing inserts 870, 872 which are complimentarily shaped to mating profiles 658, 660 of bearing conjugates 648, 650, respectively, are positioned on top of the bearing conjugates 648, 650, respectively, the bearing inserts 870, 872, being securely held by tabs 874, 876, respectively, of the bearing inserts 870, 872, respectively, placed in cavities 878, 880, respectively, on a outer periphery of an aperture 642 of a shuttle 634. Associated conjugate drivers engage the bearing inserts 870, 872 as a crankpin rotates and bear against the bearing inserts 870, 872, instead of bearing directly to the bearing conjugates 648, 650. The bearing inserts 870, 872 can be removable from the shuttle 634 so that the bearing inserts 870, 872 can be removed for repair, replacement, etc. The bearing inserts 870, 872 can also be made adjustable by any conventional means to compensate for any wear of the bearing inserts 870, 872, bearing conjugates 648, 660 and/or the associated conjugate drivers.

FIG. 12 shows castled pistons, 926, 928 which are formed monolithically with a shuttle 934. More particularly, the piston 926 is mounted on the shuttle 934 via members 1182, 1184, 1186, 1188 which are merged with each other at a center and which are integrated to the piston 926 and to the shuttle 934, while the piston 928 is mounted on the shuttle 934 via members (one of which is not shown) 1190, 1192, 1194 which are merged with each other at a center and which are integrated to the piston 928 and to the shuttle 934. The pistons 926, 928 have skirt portions 1196, 1198, respectively, which are adjacent to a common yoke portion 940 of the shuttle 934 when the pistons 926, 928 are mounted on the shuttle 934. The skirt portion 1196, 1198 have a plurality of evenly spaced cutouts 1200, 1202, respectively, around peripheries of the pistons 926, 928, respectively.

It should be noted that, because pistons undergo great stress during the operation of an engine, pistons have to be not only strong and rigid but also light to reduce inertia losses and inertia loads on the bearings. The castled pistons 926, 928 achieve the above objective. The cutouts 1200, 1202 reduce the overall weight of the pistons 926, 928, while the overall weight of the shuttle 934 is reduced by the use of the integrated members to mount the pistons 926, 928 to the shuttle 934. The cutouts 1200, 1202 also allow the thermal expansion of the pistons 926, 928 to be better controlled and regulated.

Figure 14:
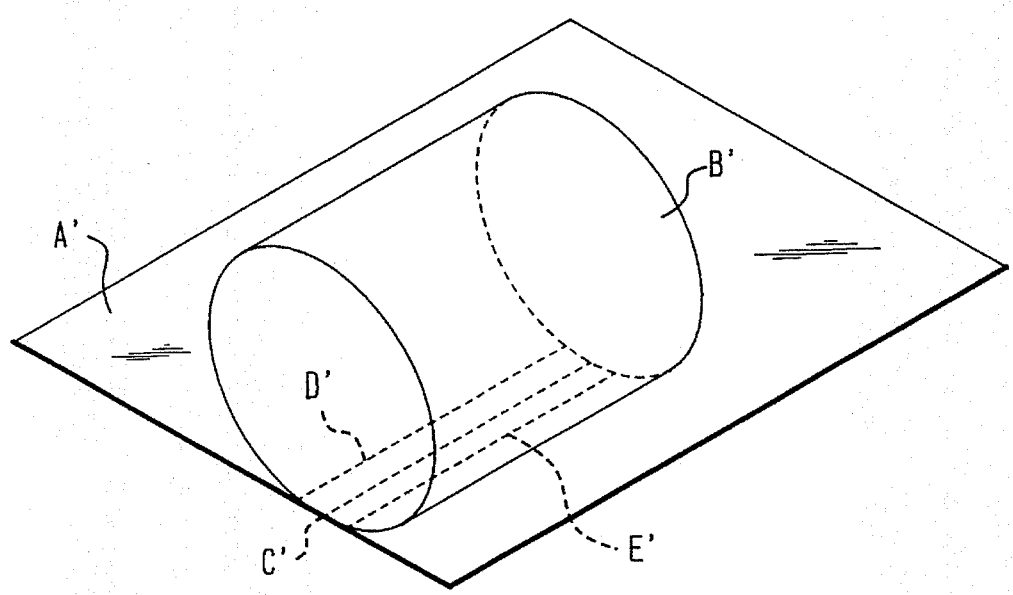
FIG. 14 is a perspective view of a prior art mechanism consisting of a cylindrical roller contacting a flat surface.

As mentioned hereinabove, the conjugate drive mechanism described herein provides several functional advantages over a roller bearing riding upon a flat surface or traditional gear shapes that otherwise might be used to intermediate between the crank and shuttle. For example, a roller bearing or wheel riding upon a flat bearing surface is depicted in FIG. 14. The flat bearing surface A' is tangent to the circumference of the wheel or roller B'. As such, there is a high degree of divergence of the two surfaces with greater divergence associated with smaller circumference. If the wheel and flat bearing surface were non-deformable and/or there is no pressure urging them together, then there would be line contact between the wheel and bearing surface, as depicted by dotted line C'. If the wheel is urged toward the bearing surface, and the materials exhibit normal elastic behavior, the elasticity of the materials result in a deformation in both such that there is a flattening out of the wheel and a depression of the flat surface resulting in an increase in contact area as represented by the area between dotted lines D' and E'. In the case of steel or other hard metals, the degree of deformation will be microscopic and will depend upon the modulus of elasticity of the material and the compressive force applied.

Figure 15:
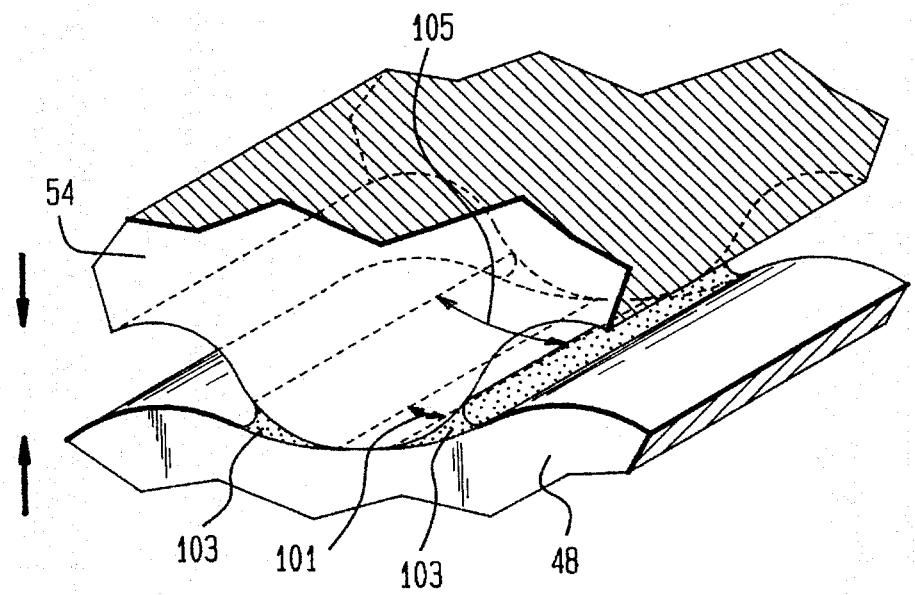
FIG. 15 is an enlarged segment of a conjugate drive mechanism of the piston device shown in FIGS. 1–5.

It can be observed in FIG. 15 that impinging curved surfaces sharing a similar average radius and direction of curvature generate a relatively wide band of effective contact area under loading forces. It should be understood that in the unloaded condition, similar but different curves will touch only along a single contact line. For example, if a cylinder is placed within a slightly larger cylinder, there can only be line contact between the cylinders at any one time (assuming no deformation). Deforming compressive forces alter this relationship significantly. FIG. 15 shows a segment of a conjugate driver, e.g., 54 impinging upon a mating portion of its corresponding bearing conjugate 48. The junction is under compressive force, as indicated by the converging arrows to the left of the drawing. Even though the curves describing the respective profiles of the conjugate driver 54 and the bearing conjugate 48 differ, they are similar. Thus, under compression, the deformation of the conjugate driver 54 and the bearing conjugate 48 results in an increase of contact area represented by the band spanned by the double-headed arrow 101. This area could be denominated the effective dry contact area under compression. The greater effective contact area experienced due to similar curved surfaces under load is a consequence of the fact that there is less distance between similarly curved surfaces than between, e.g., a curve and its tangent line. For a given deformation displacement due to metal elasticity, a larger portion of approximately parallel surfaces will come into contact than for clearly non-parallel surfaces.

Curved surfaces which tend toward parallelism are also more efficacious for establishing and maintaining a hydrodynamic wedge or film of lubricating oil between the mating surfaces. As illustrated in FIG. 15, hydrodynamic wedges of lubricant 103 not only prevent dry contact between the mating elements but also function to transfer compressive force between the converging surfaces thereby distributing the compressive force over a greater area and increasing the effective contact area. This hydrodynamic effective contact area is illustrated by double-headed arrow 105. Both the dry effective contact area 101 and the hydrodynamic effective contact area 105 will vary with the compressive force and the speed of surface conjugation.

The conjugate drive mechanism described herein exhibits mating surfaces which are more closely parallel than a tangent line to a circle. Stated another way, the average radius over a number of degrees of the "tooth" projection of the conjugate driver 54 and the average radius over the same number of degrees of the mating "tooth" depression in the bearing conjugate 48 differ only slightly. In contrast, the radius of a wheel differs by an infinite amount over the radius of a straight line which has a radius of infinite length. The practical consequence of this approximate parallelism, which exists at least over short distances, is that the deformations associated with a given load and material composition result in a greatly increased effective contact area over that of a wheel on a flat surface. One might also note that wheels, with their limited contact, concentrate the deformation forces along a narrow band of contact which results in metal fatigue and/or deformation beyond the elastic limit resulting in permanent deformation at positions of high compression (e.g., flattening of the wheel and/or bellying of the flat surface). In addition, at points in the cycle where there is light or no load on the wheel/surface interface, there can be a loss of contact or slippage such that the wheel fails to track over the bearing surface.

If conventional gearing were applied at the conjugate drive/bearing conjugate interface, it would partially solve the problem of a lack of tracking and slippage associated with wheels or rollers by exhibiting the gross mechanical interaction of interdigitation; but it would also present another set of problems. Conventional gearing typically utilizes a first rotatable member rotating about a fixed axis and having a plurality of teeth. The teeth of the first rotatable member interdigitate with the teeth of either a second rotatable member or a linearly moving rack. The teeth of the first (driver) member "paddle" against the teeth of the second (driven) member such that force is delivered by the faces of the driver gear teeth to the faces of the driven gear teeth in a direction tangent to the pitch line (i.e., circle) of the driver gear. A clearance is provided between each gear tooth tip of the first gear and the corresponding root fillet of the mating gear. There is no contact between tip and root.

In contrast, the piston engine 10 of FIGS. 1–5 is intended to transmit force between a linearly reciprocating shuttle and the crankpin of a rotating crankshaft. This force is transmitted through the trackable profile interface of the conjugate driver and bearing conjugate. The transmission of force in the piston engine 10 has significant components normal to the driver/bearing interface. Thus, the conjugate profiles are urged into compression against one another. "Paddling" type interdigitating gear teeth are not a suitable alternative for bearing compressive loads, owing, at least partially, to the clearance gap present at the tip/root interface. If interdigitating gear teeth are subjected to the forces encountered by the conjugated profiles of the piston engine 10, the interdigitating teeth of each gear would be urged toward the tip/root gap of the other gear, thereby causing a wedging action of the interdigitating teeth. This successive wedging action creates tremendous friction and an unacceptable amount of wear and could not be used in a workable device. Conventional gearing has inherent clearance and, thus, loss of contact and slippage. As described, the tip/root gap of conventional gearing does not provide an adequate load bearing support surface and indeed represents a "loss of contact". In this respect, conventional gearing exhibits an intermittent contact surface (due to the intermittent loss of contact between tip and root) in contrast to the continuous contact surface of the conjugate drive mechanism of the present invention.

As can be appreciated from the above description of FIGS. 14 and 15, the effective area of contact between the conjugate driver 54 and the bearing conjugate 48 is substantially increased over the line contact of a roller bearing (or wheel) on a tangent surface as depicted in FIG. 14. This results in the potential of the piston engine 10 to endure greater typical primary normal loading forces, thereby increasing its power density. The arrangement depicted herein (see, for instance, FIG. 15) can support greater loading forces directed along the line perpendicular to the pitch line than gear shapes which are intended to transfer torsional forces acting parallel to the pitch line. The trackable profiles of the conjugate drivers 54, 56 and bearing conjugates 48, 50 constitute the actual pitch lines and are therefore tangible rather than an intangible abstract line as in conventional gear teeth. The trackable profiles can therefore be denominated "pitch surfaces."

It should be apparent that the conjugate drivers 54, 56 and bearing conjugates 48, 50 can be configured in a variety of ways. In each instance, however, it is an objective to prevent scuffing, thereby providing an adequate load bearing support surface. Scuffing of the surfaces is avoided when the conjugate drivers 54, 56 track along the profiles of the bearing conjugates 48, 50 without loss of contact or slippage throughout the range of motion of the device. Bearing conjugates 48, 50 thus constitute trackable profiles with respect to the conjugate drivers 54, 56. In addition, one could observe that the total circumferential length of the trackable profiles of each of the bearing conjugates 48, 50 equals the total circumferential length of the corresponding profile of the conjugate drivers 54, 56, respectively.

Figure 16:
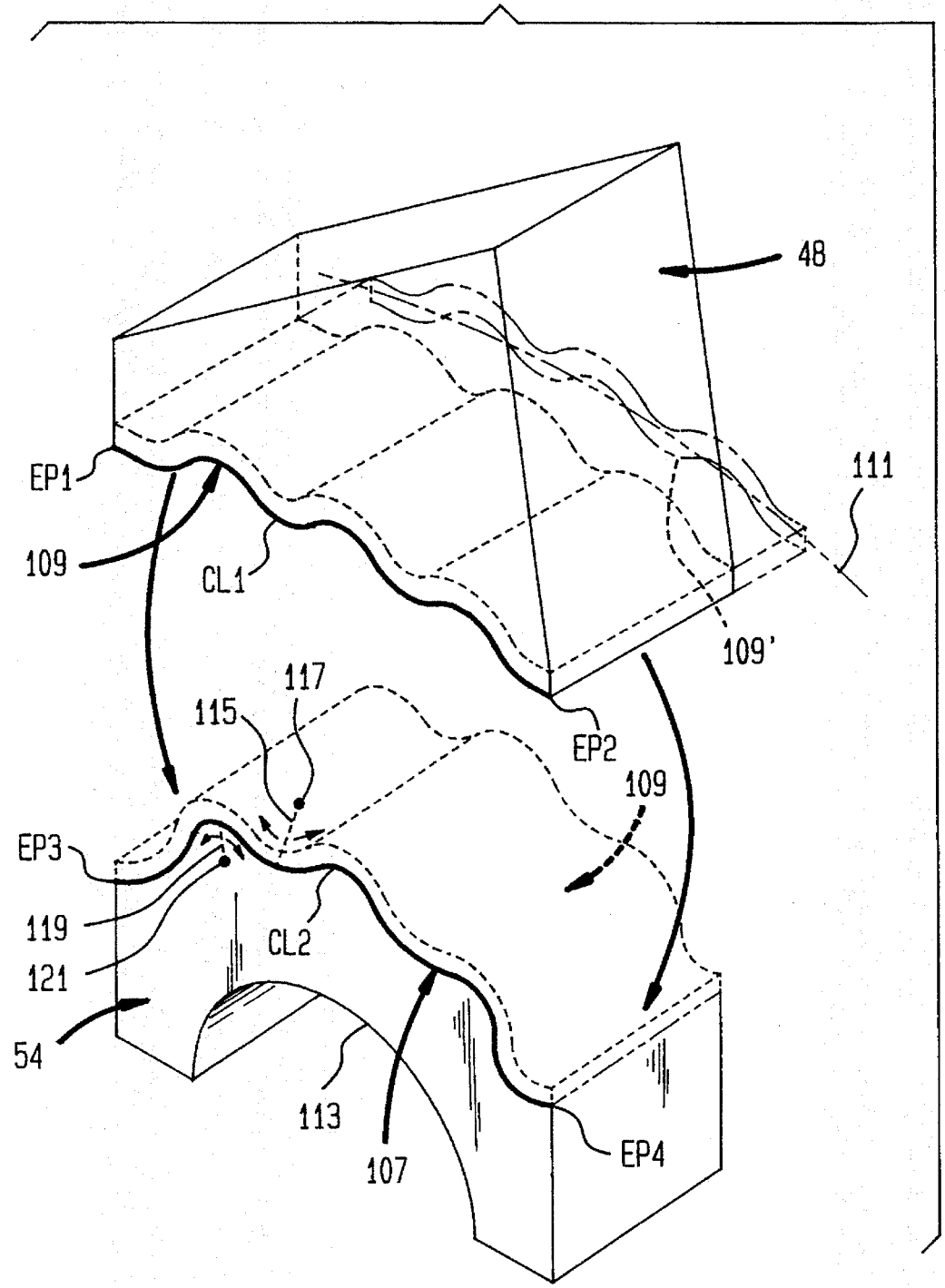
FIG. 16 is an enlarged view of a conjugate driver and mating bearing conjugate of the piston device shown in FIGS. 1–5, illustrating diagrammatically the relationship between respective mating surfaces of the conjugate driver and the bearing conjugate.

FIG. 16 illustrates the conjugate drive mechanism described herein and depicts the relationship between the conjugate driver outer surface 107 (i.e., the surface extending transversely across the conjugate driver 54 from the boldfaced curvilinear line CL2) and the bearing conjugate outer surface 109 (i.e., the surface extending transversely across the bearing conjugate 48 from the boldfaced curvilinear line CL1), the retaining walls 86, 94 having been omitted to facilitate consideration and discussion. Given a particular undulation pattern on either member, a mating trackable profile may be generated on the other. The undulation pattern of the bearing conjugate 48, for example, could be described as a continuous series of displacements above, on (zero displacement) and below a reference surface. An end-on cross-sectional view of this surface is a projection of the surface contour or profile of the bearing conjugate outer surface 109. Dotted line 109' can be defined as a series of displacements above, on (zero displacement) and below a reference line 111. In FIG. 16, the undulation pattern of the bearing conjugate outer surface 109 is translated or superimposed upon (see the phantom representation of the surface 109) the generally arcuate shape of the conjugate driver 54 to give the resultant contour of its outer surface 107. The undulations in the conjugate driver 54 can be defined by a series of displacements above, on (zero displacement) and below a reference surface associated with the conjugate driver 54, (not shown for simplicity of illustration), e.g., a cylindrical section parallel to the conjugate driver crank bearing surface 113. The bearing conjugate outer surface 109 has a circumferential length CL1, as measured between end points EP1, EP2. The circumferential length CL2 of the conjugate driver outer surface 107 is measured between end points EP3, EP4 and is of equal length to CL1.

A physical analogy for this conjugation relationship is that the undulating pattern of the bearing conjugate 48 is bent over the arcuate shape of the conjugate driver 54. It is not necessary that the conjugate driver's arcuate shape (i.e., its reference surface) be a simple cylinder, rather it may embody a compound and complex curvature. Similarly, the reference line 111 may be straight, a simple curve or a compound, complex curve. The shapes of the respective reference surfaces are selected to control the motion of the crankpin 44 (see FIG. 5) relative to the shuttle 34. It should be observed that in translating the undulations from the bearing conjugate 48 to the conjugate driver 54, the exterior radii, e.g., 115 from center 117 associated with the conjugate driver profile (outer surface 107) are lengthened while the interior radii, e.g., 119 from center 121 are shortened. With respect to certain profile shapes, such as, a compound complex curved surface, it is a simplification to associate a significant portion of the profile shape to a few radii. In that particular instance, the resulting profile curvature could be described as a chain of small arcs swept by numerous radii having distinct centers on either side of the profile.

Despite the change in radii, the overall circumferential length (which is represented by the boldfaced curvilinear line CL1, as measured between end points EP1, EP2) of the trackable profile of the bearing conjugate 48 remains the same after translation onto the conjugate driver 54, whereby the overall circumferential length (which is represented by the boldfaced curvilinear line CL2, as measured between end points EP3, EP4) of the trackable profile of the conjugate driver 54 equals the overall circumferential length of the bearing conjugate 48. That is, if both surfaces were straightened, they would be the same length (i.e., CL1= CL2). Owing to this relationship, the surface 107 of the conjugate driver 54 can track line-by-line over the surface 109 of the bearing conjugate 48 without slippage and without clearance. With respect to terms such as "equal" and "no clearance", the inventor herein recognizes that these conditions are achievable in the real world only to the level of precision inherent in machine tools. However, objectives of "equality", "no clearance" and "no scuffing" are clearly distinguishable, both in fact and intent, from clearances, such as the root/tip clearance, that are designed in or provided for in conventional gearing.

Figure 17:
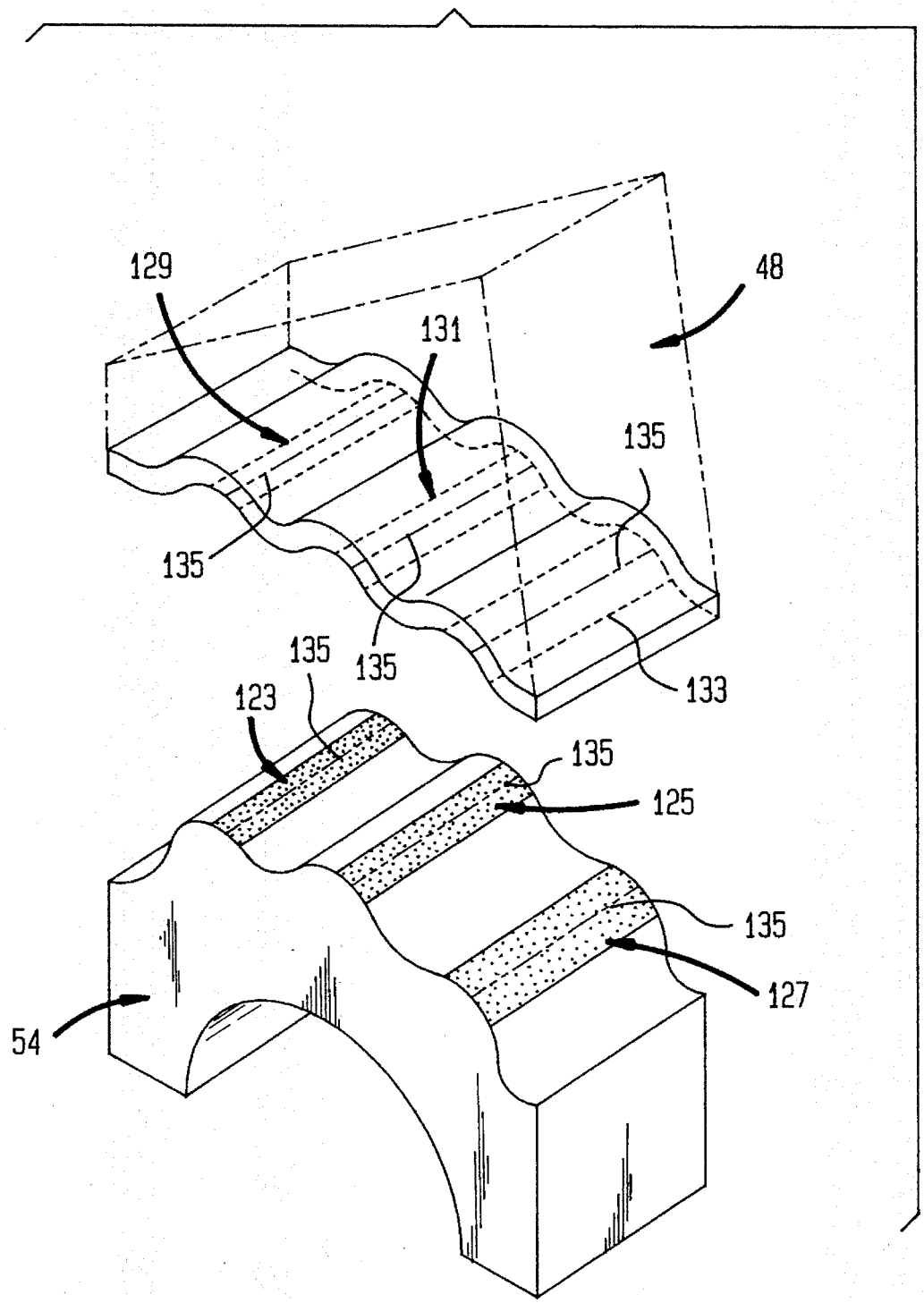
FIG. 17 is an enlarged view of the conjugate driver and mating bearing conjugate of FIG. 16 showing selected sequential contact areas.

FIG. 17 illustrates the increased dynamic effective contact area associated with the similar but unique curved surfaces of the mating conjugate driver 54 and bearing conjugate 48 (partially in phantom) under compression. The contact surfaces associated with three distinct positions occurring at distinct periods of time are illustrated. It should be understood that the three contact areas shown would not exist simultaneously as shall be further explained below. In addition, FIG. 17 depicts the tracking relationship between the conjugate driver 54 and bearing conjugate 48 (no slippage, clearance or scuffing) More specifically, in the conjugate drive mechanism described herein, the correlation of line-for-line contact between the bearing conjugate 48 and the conjugate driver 54 is, under working conditions, a correlation of bands or strips of contact, when the motion conversion apparatus is operating and the interface between the conjugate driver 54 and the bearing conjugate 48 is subjected to compressive loading forces. In addition, the effective contact area is increased by the presence of a lubricant.

FIG. 17 shows a selected group of contact areas 123, 125, 127 on the conjugate driver 54 associated with discrete points in time at discrete phases of a full range of travel of the conjugate drive 54 under one set of operating conditions, e.g., engine under no load and running at 1000 RPMs. These contact areas on the conjugate driver 54 correspond with contact areas 129, 131, 133 on the bearing conjugate 48. As illustrated, the effective surface contact areas will vary depending upon variations in loading forces experienced at different degrees in the cycle. During times of extremely high loading or overload, the dry contact area may be larger. When lightly loaded, e.g., at low RPM, the effective dry surface contact approaches line contact but a more substantial effective contact area is maintained by the hydrodynamic effect of the lubricant. To illustrate the potential variations in the width of the effective contact area due to loading, area 127 is shown as being larger than area 123. To depict the distinction between the effective contact area, e.g., 127 and the line contact associated with dry unloaded operation, a dotted line 135 is drawn through each effective contact area shown. On account of its influence on the effective contact area, the lubricant may be denominated a "contact medium" or "constant contact medium."

In operation, the effective surface contact area migrates along the interface between the conjugate driver 54 and the bearing conjugate 48 as the conjugate driver 54 tracks over the bearing conjugate 48. This migration is uninterrupted due to the constant contact between the conjugated members 48, 54. One could also express this relationship by noting that there are a continuum of contact lines (only a few of which are depicted in FIG. 17 as the dotted lines 135) arranged along the entire circumferential length of the respective profiles of the conjugate driver 54 and conjugate bearing 48. Further, the respective contact lines serially contact a corresponding contact line on the mating profile as the conjugate drive progresses through its range of motion. In this manner, the entireties of the outer surfaces 107, 109 contribute to load transmission and may be said to be load transmitting surfaces. The contact areas shown in FIG. 17 represent the contact areas that would be present at three different times.

Figure 18:
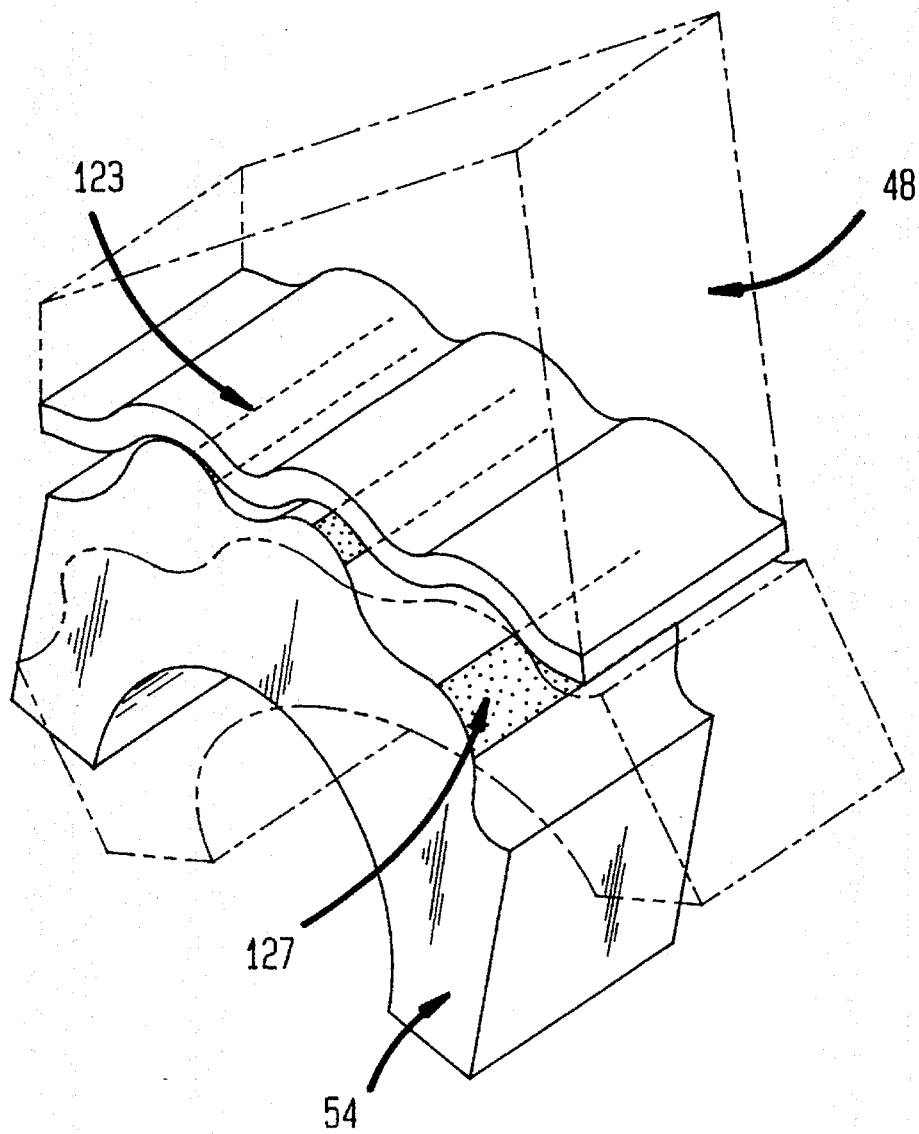
FIG. 18 is an enlarged view of the conjugate driver and mating bearing conjugate of FIG. 16 in two positions of conjugate motion.

FIG. 18 shows the rolling conjugated interaction of the bearing conjugate 48 and the conjugate driver 54. In a first position (indicated by solid lines) the conjugate driver 54 contacts the bearing conjugate 48 at contact area 123. When the conjugate driver 54 has moved into a second position (indicated by dotted lines) the area 127 on the conjugate driver 54 will be in contact with the surface of the conjugate profile of the bearing conjugate 48. The correspondence of contact areas is constant for each iteration of the conjugate drive's motion. That is, for each cycle, there is a repetition of contact area correspondence.

As described in a co-pending application, viz, Ser. No. 08/149,064, entitled Lubrication System for a Conjugate Drive Mechanism, filed Nov. 8, 1993, the maintenance of a hydrodynamic film of lubricant has notable beneficial effects and is readily achieved in the piston engine 10 of FIGS. 1–5. If a quantum of lubricant is injected between the conjugate driver and the bearing conjugate before the area of contact and preferably at a point of low loading, it will be pushed along in front of the mating interface (i.e., the migrating contact area) through the range of travel.

It may be noted that the conjugate drive mechanism described herein has certain attributes of a wheel, in that it rolls smoothly over a support surface in line-for-line contact, without clearance gaps. It also has attributes of gears, in that the conjugate driver and the bearing conjugate exhibit a repetitive tracking mechanical interaction which prevents slippage. Unlike a gear system there is no tip-to-root clearance or a multiple set of sequentially interrupted contact surfaces. Instead the contact between the conjugate driver and the bearing conjugate is continuous. The conjugate drive also exhibits an increased contact area over either the wheel or the gear. One should further note that the tracking profiles of the conjugate drivers act as self-aligning components as they interface with their respective mating profiles of the bearing conjugates.

It will be understood that the embodiments described herein are merely exemplary and that a person skilled in the art may make many variations and modifications without departing from the spirit and scope of the invention. For example, the side retaining wall, intermediate side retaining wall, end retaining wall of a conjugate driver may be placed on the mating profile of an associated bearing conjugate rather than on the tracking profile of the conjugate driver. All such variations and modifications are intended to be included within the scope of the invention as defined in the appended claims.

I claim:

1. A motion converter apparatus, comprising a shuttle movable in a reciprocating fashion along a rectilinear path, said shuttle having an aperture therein, one side of said aperture being defined by a first trackable profile, which has a first circumferential length, and an opposite side of said aperture being defined by a second trackable profile, which has a second circumferential length; a rotatable crankshaft having a crankpin positioned within said aperture of said shuttle and rotatable in a circular path; a pair of conjugate drivers rotatably mounted on said crankpin by a corresponding pair of mounting means positioned on opposite sides of an imaginary plane which passes through said crankpin and which is oriented normal to a longitudinal axis of said crankpin, one of said conjugate drivers including a first tracking profile having a third circumferential length, which is equal to said first circumferential length, a first profiled portion positioned on one side of said imaginary plane and a second profiled portion positioned on an opposite side of said imaginary plane, whereby said second profiled portion of said first tracking profile overhangs the other of said conjugate drivers, said other conjugate driver including a second tracking profile having a fourth circumferential length, which is equal to said second circumferential length, a first profiled portion positioned on said opposite side of said imaginary plane and a second profiled portion positioned on said one side of said imaginary plane, whereby said second profiled portion of said second tracking profile overhangs said one conjugate driver, said first and second tracking profiles engaging said first and second trackable profiles, respectively, in a continuous conjugating manner as said crankpin rotates in said circular path, whereby the reciprocating rectilinear motion of said shuttle is continuously converted into the rotary motion of said crankpin or vice versa.

2. The apparatus of claim 1, wherein said first tracking profile of said first conjugate driver has a continuum of first contact lines arranged along the entire circumferential length thereof such that said first contact lines serially contact corresponding contact lines on said first trackable profile, and said second tracking profile of said second conjugate driver has a continuum of second contact lines arranged along the entire circumferential length thereof such that said second contact lines serially contact corresponding contact lines on said second trackable profile.

3. The apparatus of claim 2, wherein said first trackable profile constitutes a first pitch surface, said second trackable profile constitutes a second pitch surface, said first tracking profile constitutes a third pitch surface, and said second tracking profile constitutes a fourth pitch surface.

4. The apparatus of claim 1, wherein said first trackable profile constitutes a first pitch surface, said second trackable profile constitutes a second pitch surface, said first tracking profile constitutes a third pitch surface and said second tracking profile constitutes a fourth pitch surface.

5. A motion converter apparatus, comprising a shuttle movable in a reciprocating fashion along a rectilinear path, said shuttle having an aperture therein, one side of said aperture being defined by a first trackable profile and an opposite side of said aperture being defined by a second trackable profile; a rotatable crankshaft having a crankpin positioned within said aperture of said shuttle and rotatable in a circular path; a pair of conjugate drivers rotatably mounted on said crankpin by a corresponding pair of mounting means positioned on opposite sides of an imaginary plane which passes through said crankpin and which is oriented normal to a longitudinal axis of said crankpin, one of said conjugate drivers including a first tracking profile having a first profiled portion positioned on one side of said imaginary plane and a second profiled portion positioned on an opposite side of said imaginary plane, whereby said second profiled portion of said first tracking profile overhangs the other of said conjugate drivers, said other conjugate driver including a second tracking profile having a first profiled portion positioned on said opposite side of said imaginary plane and a second profiled portion positioned on said one side of said imaginary plane, whereby said second profiled portion of said second tracking profile overhangs said one conjugate driver, said first and second tracking profiles engaging said first and second trackable profiles, respectively, in a continuous conjugating manner as said crankpin rotates in said circular path, whereby the reciprocating rectilinear motion of said shuttle is continuously converted into the rotary motion of said crankpin or vice versa, said first tracking profile of said first conjugate driver having a continuum of first contact lines arranged along the entire circumferential length thereof such that said first contact lines serially contact corresponding contact lines on said first trackable profile, and said second tracking profile of said second conjugate driver having a continuum of second contact lines arranged along the entire circumferential length thereof such that said second contact lines serially contact corresponding contact lines on said second trackable profile.

6. The apparatus of claim 5, wherein said first trackable profile constitutes a first pitch surface, said second trackable profile constitutes a second pitch surface, said first tracking profile constitutes a third pitch surface and said second tracking profile constitutes a fourth pitch surface.

7. A motion converter apparatus, comprising a shuttle movable in a reciprocating fashion along a rectilinear path, said shuttle having an aperture therein, one side of said aperture being defined by a first trackable profile, which constitutes a first pitch surface, and an opposite side of said aperture being defined by a second trackable profile, which constitutes a second pitch surface; a rotatable crankshaft having a crankpin positioned within said aperture of said shuttle and rotatable in a circular path; a pair of conjugate drivers rotatably mounted on said crankpin by a corresponding pair of mounting means positioned on opposite sides of an imaginary plane which passes through said crankpin and which is oriented normal to a longitudinal axis of said crankpin, one of said conjugate drivers including a first tracking profile, which constitutes a third pitch surface, having a first profiled portion positioned on one side of said imaginary plane and a second profiled portion positioned on an opposite side of said imaginary plane, whereby said second profiled portion of said first tracking profile overhangs the other of said conjugate drivers, said other conjugate driver including a second tracking profile, which constitutes a fourth pitch surface, having a first profiled portion positioned on said opposite side of said imaginary plane and a second profiled portion positioned on said one side of said imaginary plane, whereby said second profiled portion of said second tracking profile overhangs said one conjugate driver, said first and second tracking profiles engaging said first and second trackable profiles, respectively, in a continuous conjugating manner as said crankpin rotates in said circular path, whereby the reciprocating rectilinear motion of said shuttle is continuously convened into the rotary motion of said crankpin or vice versa.

* * * * *